(12) United States Patent
Ksondzyk

(10) Patent No.: US 8,294,687 B1
(45) Date of Patent: Oct. 23, 2012

(54) FALSE TOUCH FILTERING FOR CAPACITANCE SENSING SYSTEMS

(75) Inventor: Petro Ksondzyk, Mill Creek, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/434,642

(22) Filed: Mar. 29, 2012

Related U.S. Application Data

(60) Provisional application No. 61/602,283, filed on Feb. 23, 2012.

(51) Int. Cl.
*G09G 5/00* (2006.01)

(52) U.S. Cl. ........ 345/173; 345/174; 345/156; 345/157; 382/312; 382/313; 382/314; 178/18.01; 178/18.03; 178/18.06

(58) Field of Classification Search .......... 345/156–175; 178/18.01, 18.03, 18.06; 382/312–314
See application file for complete search history.

(56) References Cited

U.S. PATENT DOCUMENTS

| | | | |
|---|---|---|---|
| 6,343,519 | B1 | 2/2002 | Callicott et al. |
| 7,006,236 | B2 * | 2/2006 | Tomasi et al. ................. 356/614 |
| 2010/0007631 | A1 | 1/2010 | Chang |
| 2010/0201637 | A1 | 8/2010 | Herne et al. |
| 2010/0315372 | A1 * | 12/2010 | Ng .................................. 345/174 |
| 2010/0328249 | A1 | 12/2010 | Ningrat et al. |
| 2011/0074725 | A1 * | 3/2011 | Westerman et al. ........... 345/174 |
| 2011/0090169 | A1 | 4/2011 | Karhiniemi |
| 2011/0157069 | A1 | 6/2011 | Zhuang et al. |
| 2011/0157077 | A1 | 6/2011 | Martin et al. |
| 2011/0157096 | A1 | 6/2011 | Drumm |
| 2011/0242048 | A1 | 10/2011 | Guedon et al. |
| 2012/0050216 | A1 * | 3/2012 | Kremin et al. ................ 345/174 |
| 2012/0062474 | A1 * | 3/2012 | Weishaupt et al. ........... 345/173 |

FOREIGN PATENT DOCUMENTS

WO 0203368 A 1/2002

OTHER PUBLICATIONS

Baanto_Palm Detection & Rejection_3 pages.
Baanto_Rain and Fluid Discrimination for Touchscreens_4 pages.
Search Report for U.S. Appl. No. 13/434,642, Dated Mar. 2012, 12 pages.
Touch System ef Washing Machine and False Touch Elimination Method Used Thereby_Dated Jul. 22, 2009_1 page.

* cited by examiner

*Primary Examiner* — Lun-Yi Lao
*Assistant Examiner* — Priyank Shah

(57) ABSTRACT

Apparatuses and methods of false touch filtering are described. One device includes a controller and a capacitance sensing array including multiple sense elements (e.g., intersections of TX and RX electrodes). The controller includes a capacitance sensing circuit coupled to the capacitance sensing array, and a filter circuit coupled to the output of the capacitance sensing circuit. The controller is configured to receive, from the capacitance sensing circuit, data representing capacitances of the sense elements, process the data to identify activated sense elements, and filter the data to remove false touch events based on a spatial relationship of activated sense elements.

19 Claims, 24 Drawing Sheets

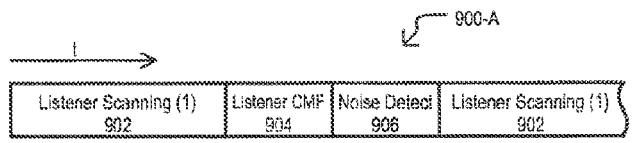
FIG. 9A
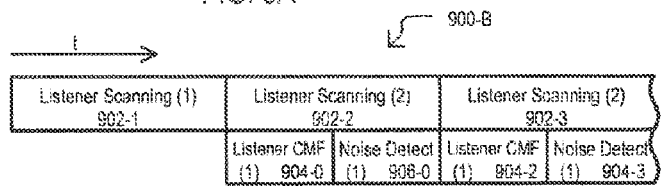
FIG. 9B
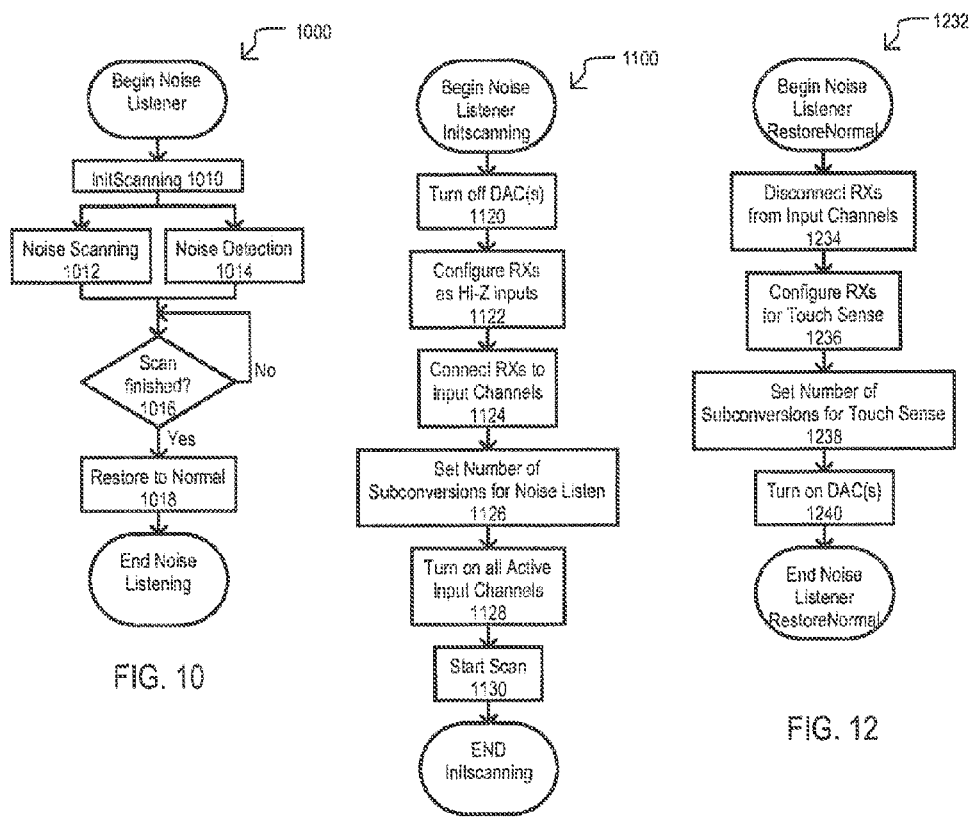
FIG. 10
FIG. 11
FIG. 12

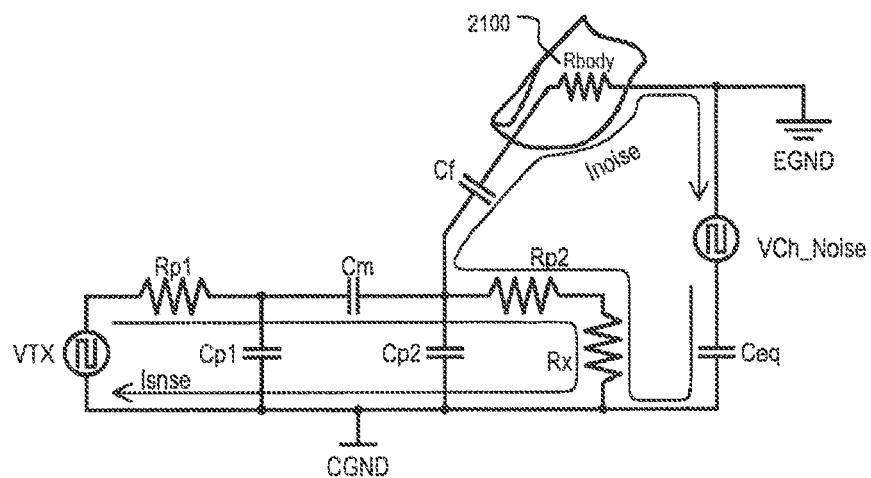
FIG. 21 (BACKGROUND)
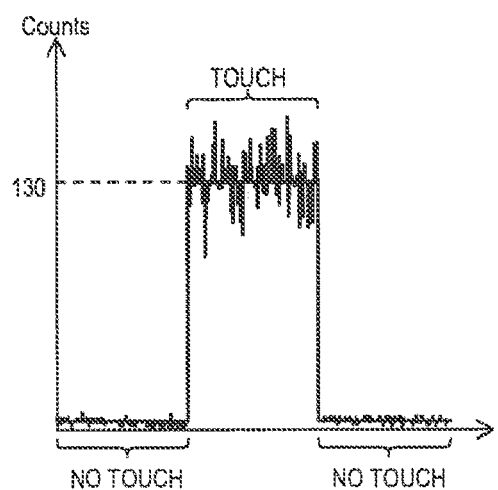
FIG. 22 (BACKGROUND)

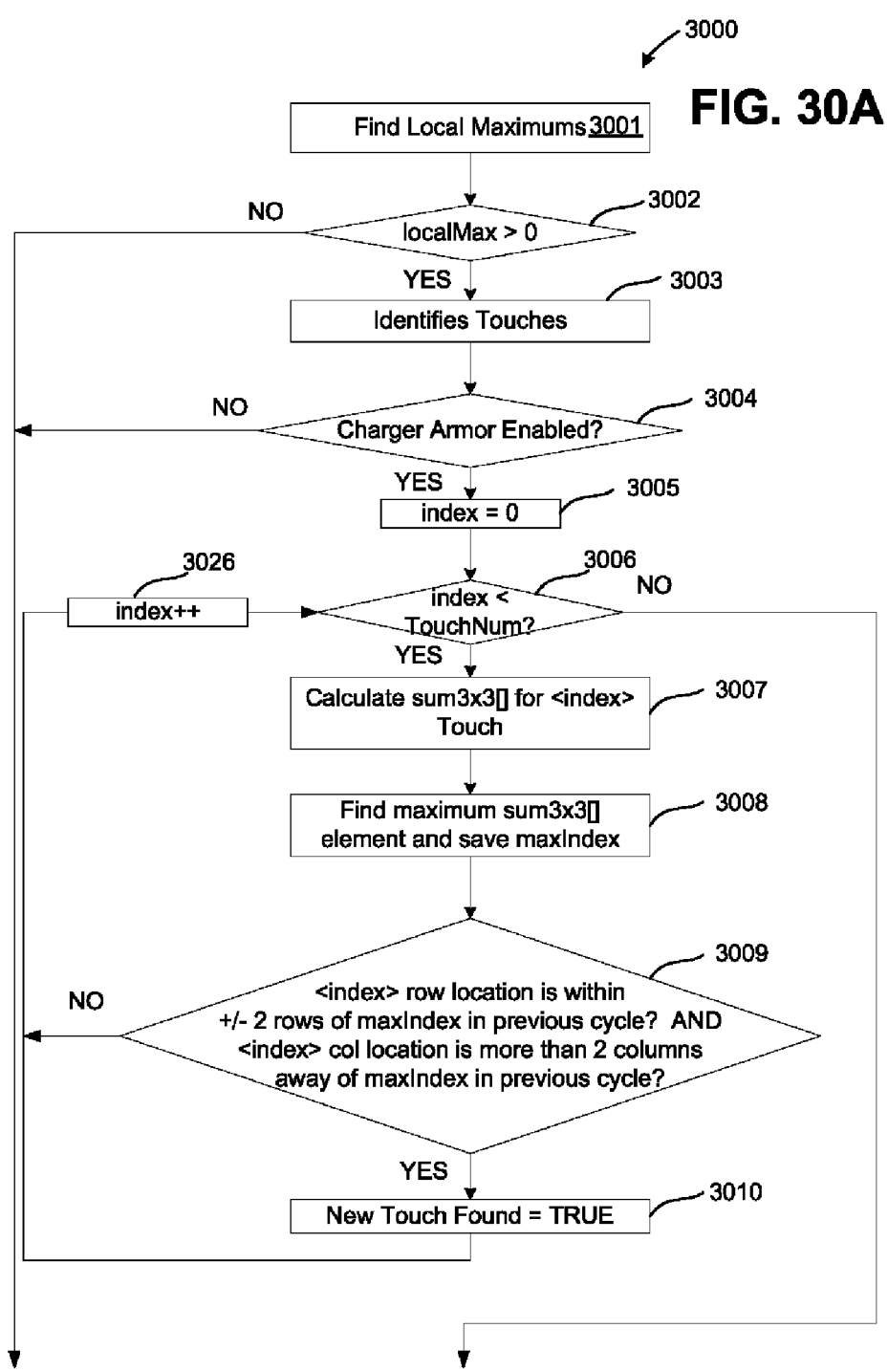

FALSE TOUCH FILTERING FOR CAPACITANCE SENSING SYSTEMS

RELATED APPLICATIONS

This application claims the benefit of U.S. Provisional Application No. 61/602,283, filed Feb. 23, 2012, the entire contents of which are incorporated by reference.

TECHNICAL FIELD

The present disclosure relates generally to capacitance sensing systems, and more particularly to noise filtering in such systems.

BACKGROUND

Capacitance sensing systems can sense electrical signals generated on electrodes that reflect changes in capacitance. Such changes in capacitance can indicate a touch event (i.e., the proximity of an object to particular electrodes). Electrical sense signals can be degraded by the presence of noise.

Noise in capacitance sensing systems can be conceptualized as including "internal" noise and "external noise". Internal noise can be noise that can affect an entire system at the same time. Thus, internal noise can appear on all electrodes at the same time. That is, internal noise can be a "common" mode type noise with respect to the sensors (e.g., electrodes) of a system. Sources of internal noise can include, but are not limited to: sensor power supply noise (noise present on a power supply provided to the capacitance sensing circuit) and sensor power generation noise (noise arising from power generating circuits, such as charge pumps, that generate a higher magnitude voltage from a lower magnitude voltage).

In touchscreen devices (i.e., devices having a display overlaid with a capacitance sensing network), a display can give rise to internal noise. As but a few examples, display noise sources can include, but are not limited to: LCD VCOM noise (noise from a liquid crystal display that drives a segment common voltage between different values), LCD VCOM coupled noise (noise from modulating a thin film transistor layer in an LCD device that can be coupled through a VCOM node), and display power supply noise (like sensor power generation noise, but for power supplied of the display).

Common mode type noise can be addressed by a common mode type filter that filters out noise common to all electrodes in a sense phase.

External noise, unlike internal noise, can arise from charge coupled by a sensed object (e.g., finger or stylus), and thus can be local to a touch area. Consequently, external noise is typically not common to all electrodes in a sense phase, but only to a sub-set of the electrodes proximate to a touch event.

Sources of external noise can include charger noise. Charger noise can arise from charger devices (e.g., battery chargers that plug into AC mains, or those that plug into automobile power supplies). Chargers operating from AC mains can often include a "flyback" transform that can create an unstable device ground with respect to "true" ground (earth ground). Consequently, if a user at earth ground touches a capacitance sense surface of a device while the device is connected to a charger, due to the varying device ground, a touch can inject charge at a touch location, creating a localized noise event.

Other sources of external noise can arise from various other electrical fields that couple to a human body, including but not limited to AC mains (e.g., 50/60 Hz line voltage), fluorescent lighting, brushed motors, arc welding, and cell phones or other radio frequency (RF) noise sources. Fields from these devices can be coupled to a human body, which can then be coupled to a capacitance sensing surface in a touch event.

FIG. 21 is a schematic diagram of model showing charger noise in a conventional mutual capacitance sensing device. A voltage source VTX can be a transmit signal generated on a TX electrode, Rp1 can be a resistance of a TX electrode, Cp1 can be (self) capacitance between a TX electrode and device ground (which can be a charger ground CGND), Cm can be a mutual capacitance between a TX electrode and a receive (RX) electrode, Cp2 can be a self-capacitance of an RX electrode, Rp2 can be a resistance of a RX electrode. Rx can represent an impedance of a capacitance sensing circuit.

Cf can be a capacitance between a sense object 2100 (e.g., finger). A voltage source VCh_Noise can represent noise arising from differences between CGND and earth ground (EGND). Voltage source VCh_Noise can be connected to a device ground by an equivalent capacitance Ceq.

As shown in FIG. 21, a sense current (Isense) can be generated in response to source VTX that can vary in response to changes in Cm. However, at the same time, a noise current (Inoise) can arise a touch event, due to the operation of a charger. A noise current (Inoise) can be additive and subtractive to an Isense signal, and can give rise to erroneous sense events (touch indicated when no touch occurs) and/or erroneous non-sense events (touch not detected).

FIG. 22 shows capacitance sense values (in this case counts) corresponding to non-touch and touch events in a conventional system subject to external noise. As shown, while a device is not touched (NO TOUCH) noise levels are relatively small. However, while a device is touched (TOUCH) noise levels at the touch location are considerably higher.

While capacitance sensing systems can include common mode type filtering, such filtering typically does not address the adverse affects of external noise, as such noise is not present on all electrodes, but rather localized to electrodes proximate a sense event.

BRIEF DESCRIPTION OF THE DRAWINGS

The present invention is illustrated by way of example, and not of limitation, in the figures of the accompanying drawings in which:

FIGS. 9A and 9B are diagrams showing noise listening operations according to an embodiment.

FIG. 10 is a flow diagram of a noise listening operation according to an embodiment.

FIG. 11 is a flow diagram of a noise listening scan initialization operation according to an embodiment.

FIG. 12 is a flow diagram of a noise listening restore-to-normal operation according to an embodiment.

FIG. 21 is a schematic diagram showing charger noise in a conventional mutual capacitance sensing device.

FIG. 22 shows capacitance sense values with external noise corresponding to non-touch and touch events in a conventional system.

FIGS. 30A and 30B are flow charts illustrating a method of false touch filtering according to one embodiment.

DETAILED DESCRIPTION

Figure 1:
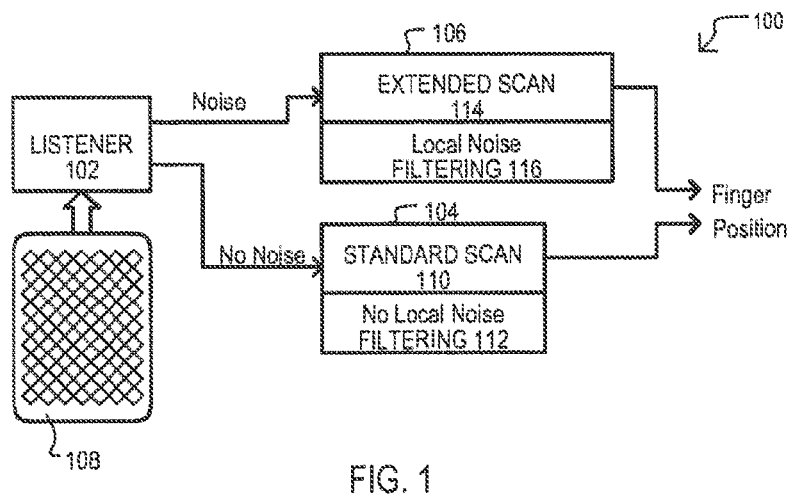
FIG. 1 is a flow diagram of a capacitance sensing operation according to an embodiment.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Various embodiments will now be described that show capacitance sensing systems and methods that listen for noise and alter filtering of sensed values according to a noise level. In particular embodiments, if noise levels are below a certain threshold, indicating the absence of (or low levels of) external noise (i.e., noise localized to a touch area), sensed values can be filtered for common mode type noise. However, if noise levels are above the threshold, sensed valued can be filtered to account for external noise. In particular embodiments, filtering for localized noise can include a median filter.

In the embodiments below, like items are referred to by the same reference character but with the leading digit(s) corresponding to the figure number.

FIG. 1 shows a flow diagram of a capacitance sensing system operation 100 according to one embodiment. A system operation 100 can include a listening operation 102, a no local noise processing path 104, and a local noise processing path 106. A listening operation 102 can monitor a sense network 108 for noise. A sense network 108 can include multiple electrodes for sensing a capacitance in a sensing area. In a particular embodiment, a sense network 108 can be a mutual capacitance sensing network having transmit (TX) electrodes that can be driven with a transmit signal, and receive (RX) electrodes coupled to the TX electrodes by a mutual capacitance.

In some embodiments, a listening operation 102 can use the same electrodes used for capacitance sensing (e.g., touch position detection) for noise detection. In a very particular embodiment, a listening operation 102 can monitor all RX electrodes for noise. In an alternate embodiment, a listening operation 102 can monitor all RX electrodes in a noise listening operation. In yet another embodiment, a listening operation 102 can monitor both TX and RX electrodes in a listening operation.

A listening operation 102 can compare detected noise to one or more threshold values to make a determination on the presence of noise. If noise is determined to be present (Noise), a local noise processing path 106 can be followed. In contrast, if no noise is determined to be present (No Noise), a no local noise processing path 104 can be followed.

Processing paths 104 and 106 show how sense signals derived from sense network 108 can be acquired and filtered. A no local noise processing path 104 can acquire sense values from a sense network 108 with a standard scan 110 and non-local filtering 112. A standard scan 110 can sample electrode values to generate sense values using a set number of sample operations and/or a set duration. Non-local filtering 112 can provide filtering that is not directed at local noise events, such as those arising from external noise. In particular embodiments, non-local filtering 112 can include common mode type filtering that filters for noise common to all sense electrodes.

A local noise processing path 106 can address the adverse affects of local noise, like that arising from external noise. A local noise processing path 106 can acquire sense values from a sense network 108 with an extended scan 114 and local filtering 116. An extended scan 114 can sample electrode values with a larger number of sample operations and/or a longer duration than the standard scan 110. In addition, local filtering 116 can provide filtering to remove local noise events, such as those arising from external noise. In particular embodiments, local filtering 116 can include median filtering.

In this way, in response to the detection of noise, a processing of capacitance sense signals can switch from a standard scan time and non-local filtering to an increased scan time and local filtering.

Figure 2:
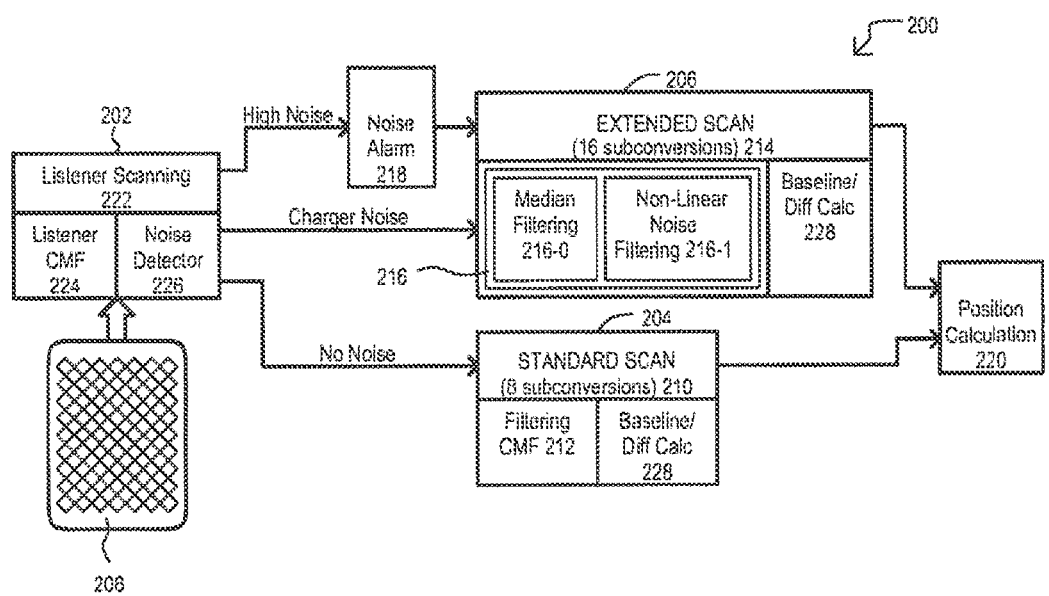
FIG. 2 is a flow diagram of a capacitance sensing operation according to another embodiment.

FIG. 2 shows a flow diagram of a capacitance sensing system operation 200 according to another embodiment. In one particular embodiment, system operation 200 can be one implementation of that shown in FIG. 1. In addition to items like those shown in FIG. 1, FIG. 2 further shows a noise alarm operation 218 and touch position calculation operation 220.

In the embodiment shown, a listening operation 202 can include listener scanning 222, listener common mode filtering (CMF) 224, and noise detection 226. Listener scanning 222 can include measuring signals on multiple electrodes of sense network 208. Scanning (noise signal acquisition) times can be selected based on sense network and expected noise source(s). A listener CMF 224 can filter for noise common to all electrodes being scanned. Such filtering can enable external type noise (noise local to a subset of the scanned electrodes) to pass through for noise detection 226.

Noise detection 226 can establish whether any detected noise exceeds one or more thresholds. In the embodiment shown, if noise is below a first threshold, noise detection 226 can activate a "No Noise" indication. If noise is above a first threshold, noise detection 226 can activate a "Noise" indication. If noise is above a second threshold, greater than the first threshold, noise detection 226 can activate a "High Noise" indication.

In the case of a "No Noise" indication, processing can proceed according to no local noise processing path 204. Such a processing path 204 can utilize a standard scanning 210, which in the particular embodiment shown can include 8 sub-conversions per electrode. A sub-conversion can be an elementary signal conversion event, and can reflect demodulation and/or integration results for one or more full input signal periods. Such processing can further include a CMF filtering 212 of values sensed on multiple electrodes. Such values can then be subject to baseline and difference calculations 228, which can determine and difference between current sense values and baseline values. A sufficiently large difference can indicate a touch event.

In the case of a "Noise" indication, processing can proceed according to local noise processing path 206. Local noise processing 206 can increase signal acquisition time with an extended scanning 214 that utilizes 16 sub-conversion (i.e., doubles a scanning time versus the no noise case). A processing path 206 can further include non-CMF filtering 216 that can filter for external noise events affecting a local set of electrodes. In the particular embodiment shown, non-CMF filtering 216 can include median filtering 216-0 and non-linear filtering 216-1. Resulting filtered sense values can then be subject to baseline and difference calculations 228, like that described for the no local noise processing path 204.

In the case of a "High Noise" indication, processing can include activation of an alarm indication 218. An alarm indication 218 can inform a user and/or a system that noise levels are high enough to result in erroneous capacitance sensing results. In a very particular embodiment, such a warning can be a visual warning on a display associated with the sense network 208 (e.g., a touchscreen display). However, warnings may include various other indication types, including but not limited to: a different type of visual alarm (e.g., LED), an audio alarm, or a processor interrupt, to name just a few. In the embodiment of FIG. 2, in response to a "High Noise" indication, processing may also proceed according to local noise processing path 206. However, in other embodiments, capacitance sense processing could be interrupted, or additional filtering or signal boosting could occur.

Operation 200 can also include touch position calculations 220. Such actions can derive positions of touch events from sense values generated by processing paths 204 and 206. Touch position values generated by calculations 220 can be provided to a device application, or the like.

In this way, a listening circuit can include common mode filtering of sense electrodes to listen for localized noise events, such as external noise from a device charger or the like. Sense signals can be filtered based on sensed noise values and/or an alarm can be triggered if noise levels exceed a high threshold value.

Figure 3:
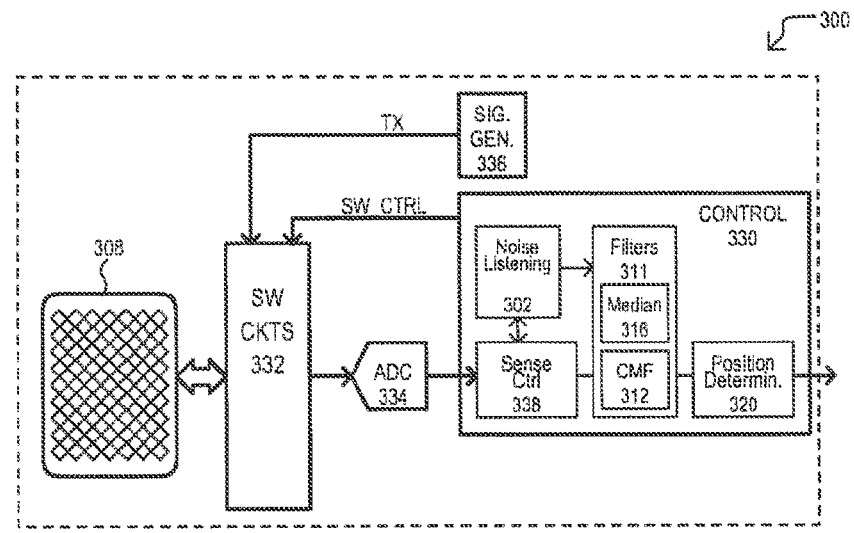
FIG. 3 is a block schematic diagram of a capacitance sensing system according to an embodiment.

Referring now to FIG. 3, a capacitance sensing system according to an embodiment is shown in a block schematic diagram and designated by the general reference character 300. A system 300 can include a sense network 308, switch circuits 332, an analog-to-digital converter (ADC) 334, a signal generator 336, and a controller 330. A sense network 308 can be any suitable capacitance sense network, including a mutual capacitance sensing network, as disclosed herein. A sense network 308 can include multiple sensors (e.g., electrodes) for sensing changes in capacitance.

Switch circuits 332 can selectively enable signal paths, both input and output signal paths, between a sense network 308 and a controller 330. In the embodiment shown, switch circuits 332 can also enable a signal path between a signal generator 336 and sense network 308.

An ADC 334 can convert analog signals received from sense network 308 via switching circuits 308 into digital values. An ADC 334 can be any suitable ADC, including but not limited to a successive approximation (SAR) ADC, integrating ADC, sigma-delta modulating ADC, and a "flash" (voltage ladder type) ADC, as but a few examples.

A signal generator 336 can generate a signal for inducing sense signals from sense network 308. As but one example, a signal generator 336 can be a periodic transmit (TX) signal applied to one or more transmit electrodes in a mutual capacitance type sense network. A TX signal can induce a response on corresponding RX signals, which can be sensed to determine whether a touch event has occurred.

A controller 330 can control capacitance sensing operations in a system 300. In the embodiment shown, a controller can include sense control circuits 338, filter circuits 311, position determination circuits 320, and noise listening circuits 302. In some embodiments, controller 330 circuits (e.g., 338, 311, 320 and 302) can be implemented by a processor executing instructions. However, in other embodiments, all or a portion of such circuits can be implemented by custom logic and/or programmable logic.

Sense control circuits 338 can generate signals for controlling acquisition of signals from sense network 308. In the embodiment shown, sense control circuits 338 can activate switch control signals SW_CTRL applied to switching circuits 332. In a particular embodiment, mutual capacitance sensing can be employed, and sense control circuits 338 can sequentially connect a TX signal from signal generator 336 to TX electrodes within sense network 308. As each TX electrode is driven with the TX signal, sense control circuits 338 can sequentially connect RX electrodes to ADC 334 to generate digital sense values for each RX electrode. It is understood that other embodiments can use different sensing operations.

Noise listening circuits 302 can also control acquisition of signals from sense network 308 by activating switch control signals SW_CTRL. However, noise listening circuit 302 can configure paths to sense network 308 to enable the detection of local noise, as opposed to touch events. In a particular embodiment, noise listening circuit 302 can isolate signal generator 336 from sense network 308. In addition, multiple groups of electrodes (e.g., RX, TX or both) can be simultaneously connected to ADC 334. Noise listener 302 can filter such digital values and then compare them to noise thresholds to determine a noise level. Such actions can include arriving at "No Noise", "Noise" and optionally "High Noise" determinations as described for FIG. 2.

In response to a noise determination from noise listening circuit 302, a controller 330 can alter capacitance sensing operations. In one embodiment, if noise is detected, signal acquisition times can be increased (e.g., sub-conversions increased) and filtering can be changed (e.g., median filtering instead of common mode filtering).

Filter circuits 311 can filter sense values generated during sense operations and noise detection operations. In the embodiment shown, filter circuits 311 can enable one or more types of median filtering 316 and one or more types of CMF 312. It is understood that filter circuits can be digital circuits operating on digital values representing sensed capacitance. In a particular embodiment, filter circuits 311 can include a processor creating sense value data arrays from values output from ADC 334. These arrays of sense values can be manipulated according to one or more selected filtering algorithm to create an output array of filtered sense values. A type of filtering employed by filter circuits 311 can be selected based on detected noise levels.

Position determination circuits 320 can take filtered sense values to generate touch position values (or no detected touches) for use by other processes, such as applications run by a device.

In this way, a capacitance sensing system can include listening circuits for detecting noise values and digital filters, selectable based on a detected noise level.

Figure 4:
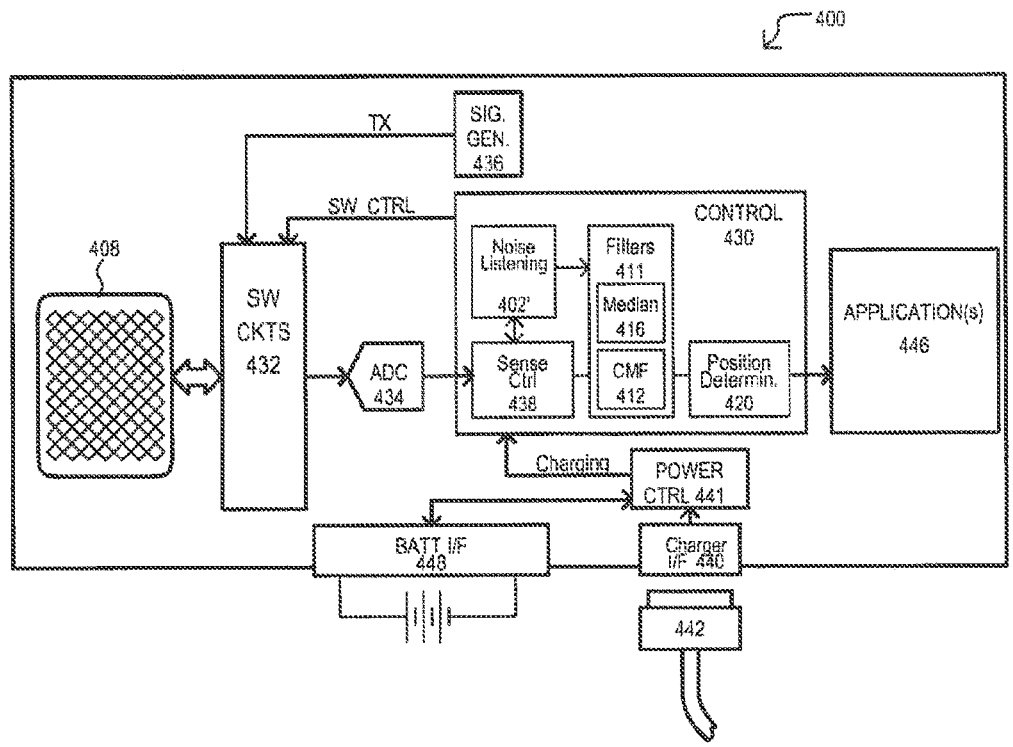
FIG. 4 is a block schematic diagram of a capacitance sensing system having charger detection according to an embodiment.

Referring now to FIG. 4, a capacitance sensing system according to another embodiment is shown in a block schematic diagram and designated by the general reference character 400. In the embodiment of FIG. 4, a noise listening operation can vary based on a system condition. In the particular embodiment shown, noise listening can be enabled or disabled based on the presence of a charger.

A system 400 can include sections like those of FIG. 3, and such sections can have the same or equivalent structures as FIG. 3. FIG. 4 differs from FIG. 3 in that it also shows a charger interface 440, battery interface 448, power control circuits 441, and application(s) 446.

A charger interface 440 can enable power to be provided to system 400 that charges a battery via a battery interface 448. In some embodiments, a charger interface 440 can be a physical interface that creates a mechanical connection between a charger 442 and the system 400. In a particular embodiment, such a physical connection can include a ground connection that can give rise to injected current as represented in FIG. 22. However, alternate embodiments can include wireless charging interfaces.

Power control circuits 441 can activate a charging indication (Charging) when a charger 442 is coupled to a system 400, and thus can present an external noise source. In addition, power control circuits 441 can control charging operations of a battery via batter interface 448.

Referring still to FIG. 4, listening circuits 402' can vary listening operations in response to a charger indication (Charging). In one embodiment, if the Charging indication is inactive, indicating that a charger 442 is not present, listening circuits 402' can be disabled. If the Charging indication is active, listening circuits 402' can be enabled. However in other embodiments, listening circuits 402' can switch between different types of listening operations based on a charger indication (Charging).

It is understood that while a charger can be one source of noise, other types of power supplies for a device can be a source of noise (e.g., AC/DC converters within such devices). For example, some devices can be connected to a computer with its own external power supply, or even a charger within an automobile.

Application(s) 446 can be programs executable by a system 400 utilizing position values from position determination circuits 420.

In this way, a capacitance sensing system can vary listening circuit operations that detect noise values based on a physical condition of the system.

Figure 5:
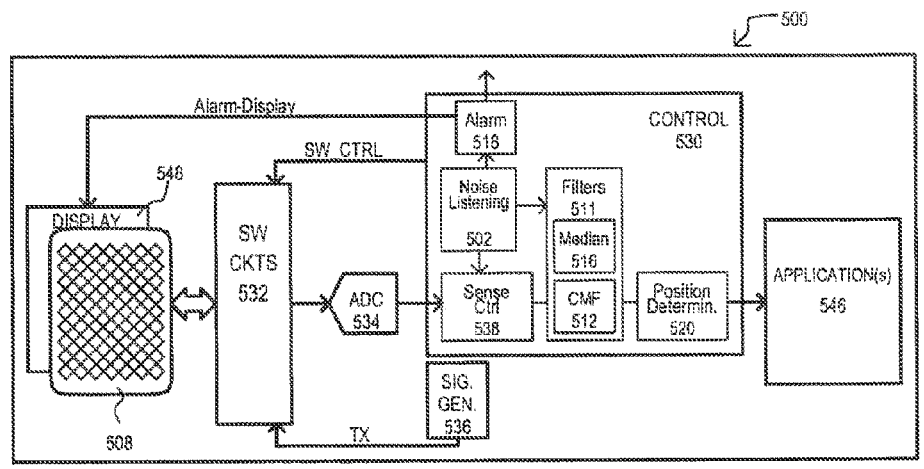
FIG. 5 is a block schematic diagram of a capacitance sensing system having a display alarm according to an embodiment.

Referring now to FIG. 5, a capacitance sensing system according to a further embodiment is shown in a block schematic diagram and designated by the general reference character 500. In the embodiment of FIG. 5, an alarm can be generated when noise exceeds a threshold value.

A system 500 can include sections like those of FIG. 3, and such sections can have the same or equivalent structures as FIG. 3. FIG. 5 differs from FIG. 3 in that is also shows an alarm circuit 518, a display 548 and application(s) 546.

A listening circuit 502 can provide a noise level indication to alarm circuit 516 when detected noise is determined to exceed a high threshold. An alarm circuit 516 can activate one or more alarms, when the noise threshold is exceeded. In the very particular embodiment shown, alarm circuit 516 can provide an alarm (Alarm-Display) to display 548. In response to such an alarm, a display 548 can show a visual alarm indicating that touch inputs are affected by noise (e.g., touch inputs will not be accepted, etc.). In one particular embodiment, display 548 and sense network 508 can be a touchscreen assembly (i.e., sense network 508 is physically overlaid on display 548).

In some embodiments, an alarm circuit 516 can provide an alarm to application(s) 546. Such applications can then alter execution and/or generate their own alarm. Further, as noted in conjunction with FIG. 2, an alarm can take various other forms (e.g., an interrupt, or the like).

In this way, a capacitance sensing system can generate an alarm for a user in the event noise levels exceed a predetermined threshold.

Figure 6:
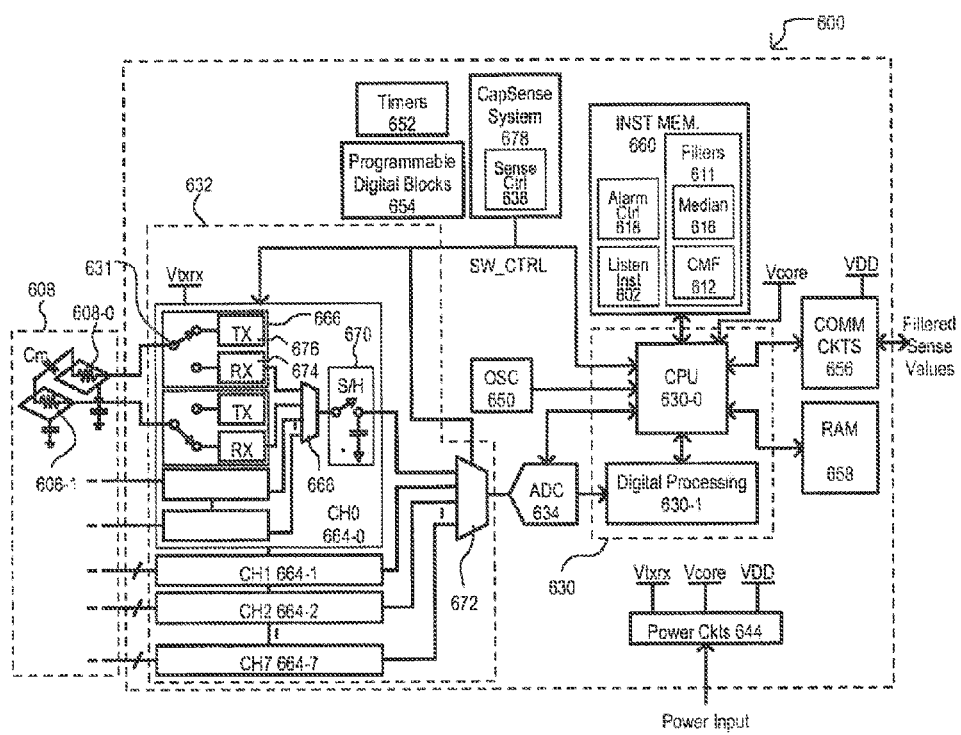
FIG. 6 is a block schematic diagram of a capacitance sensing system according to another embodiment.

Referring now to FIG. 6, a capacitance sensing system according to another embodiment is shown in a block schematic diagram and designated by the general reference character 600. The embodiment of FIG. 6 shows an implementation utilizing a processor and instructions to provide listening, selectable filtering, and alarm functions.

A system 600 can include switching circuits 632, controller 630, a capacitance sense system 678, oscillator circuits 650, an ADC 634, instruction memory 660, communication circuits 656, random access memory (RAM) 658, and a power control circuits 644.

Switching circuits 632 can provide analog signal paths between a sense network 608 and circuits within a system 600. In the embodiment shown, switching circuits 632 can include a number of channels 664-0 to -7 and a channel multiplexer (MUX) 672. Switching and MUXing operations within switching circuits 632 can be controlled by switch control signals (SW_CTRL) provided by controller 630. Each channel (664-0 to -7) can include a number of input/ output (I/O) switches (one shown 666) connected to an I/O connection 631, an I/O MUX 668, and a sample and hold (S/H) circuit 670. Each I/O switch (666) can connect a corresponding I/O 631 to a RX path (one shown as 674) or a TX path (one shown as 676). I/O MUX 668 can connect one of RX paths 674 within a channel to the corresponding S/H circuit 670. TX paths 676 can receive a TX signal. A channel MUX 672 can selectively connect a S/H circuit 670 within each channel (664-0 to -7) to ADC 634.

An ADC 634 can include any suitable ADC as described herein, or an equivalent.

FIG. 6 shows a system 600 connected to mutual capacitance sense network 608. Sense network 608 can include TX electrodes formed by TX plates (one shown as 608-0) and RX plates (one shown as 608-1). By operation of switching circuits 632, TX electrodes can be connected to a TX path 676, while multiple RX electrodes are connected to corresponding RX paths 674.

In the embodiment of FIG. 6, a controller 630 can include a processor 630-0 and digital processing circuits 630-1. A processor 630-0 can control operations of digital processing circuits 630-1 in response to instructions stored in instruction memory 660. Instruction memory 660 can include noise listening instructions 602, alarm control instructions 618, and filter instructions 611. Filter instructions 611 can include multiple filtering operations, and in the embodiment shown, can include median filter instructions 616 and CMF instructions 612.

In response to noise listening instructions 602, a controller 630 can generate signals that connect multiple I/Os 631 to ADC 634. In one embodiment, values can be subject to an initial listening CMF operation. Such an operation can be called from filter instructions 611 or be built into noise listening instructions 602. Resulting values can then be compared to one or more thresholds to determine a noise level. If a noise level exceeds a certain level, a listening circuit 602 can establish capacitance sensing parameters directed to filtering local noise (e.g., an external noise source). In some embodiments, such parameters can include those described for other embodiments, including an increased scan time and/or non-common mode (e.g., median) filtering. In addition, if a noise threshold level is above another certain level, alarm instructions 618 can be called to generate an appropriate alarm.

Processor 630-0 alone, or in combination with digital processing circuits 630-1, can perform arithmetic and logic operations for detecting noise and/or filtering sense values.

Capacitance sensing system 678 can include circuits for performing capacitance sensing operations. In some embodiments, capacitance sensing system 678 can include sense control circuits 638 that generate switch control signals for controlling switching circuits 632. In one embodiment, capacitance sensing system 678 can perform sensing operation based on criteria established by controller 630. In a particular embodiment, a controller 630 can vary a sensing time (e.g., number of sub-conversions) based on a noise level.

Referring still to FIG. 6, oscillator circuits 650 can generate signals for controlling timing of operations within system 600. In one embodiment a TX signal presented at TX paths 676 can be provided by, or derived from signals generated by oscillator circuits 650.

Communication circuits 656 can provide capacitance sensing results to other systems or circuits of a device containing the capacitance sensing system 600. RAM 658 can be provided to enable processor 630-0 to execute arithmetic operations and/or temporarily store instruction data. In particular embodiments, a RAM 658 can store sense value matrices that are manipulated by processor 630-0 to detect noise and/or filter capacitance sense values.

Power control circuits 644 can generate power supply voltages for various portions within a system 600. In some embodiments, power control circuits 644 provide a charging indication, like that described for FIG. 4, which can indicate when a charger is coupled to the system 600. A processor 630-0 can then bypass noise listening instructions 602 in the absence of a charger, or may select between multiple listening algorithms based on the presence or absence of a charger.

FIG. 6 also shows timer circuits 652 and programmable circuits 654. Timer circuits 652 can provide timing functions for use by various sections of system 600. Programmable circuits 654 can be programmed with configuration data to perform custom function. In the embodiment shown, programmable circuits 654 can include programmable digital blocks.

In a very particular embodiment, a system 600 can be implemented with the PSoC® 3 type programmable system-on-chip developed by Cypress Semiconductor Corporation of San Jose, Calif. U.S.A.

In this way, a capacitance sensing system can include a processor that can execute any of: noise listening instructions, noise alarm instructions, median filtering, and CMF.

Figure 7:
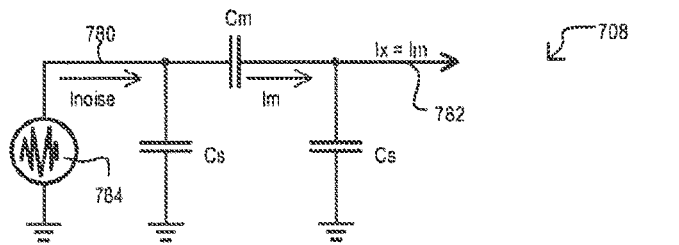
FIG. 7 is a schematic diagram of a noise listening circuit according to an embodiment.

FIG. 7 is a schematic diagram showing a noise listening configuration for a mutual capacitance sense network 708 according to an embodiment. A sense network 708 can include first electrodes (one shown as 780) and second electrodes (one shown as 782) coupled to one another by a mutual capacitance Cm. Noise, represented by noise voltage source 784, on one or more first electrodes 780 can induce a noise signal (Ix) by mutual capacitance coupling. In a very particular embodiment, first electrodes 780 can be TX electrodes and second electrodes 782 can be RX electrodes. However, the TX electrodes are not driven by any system generated TX signal, but rather are used to detect noise.

Figure 8A:
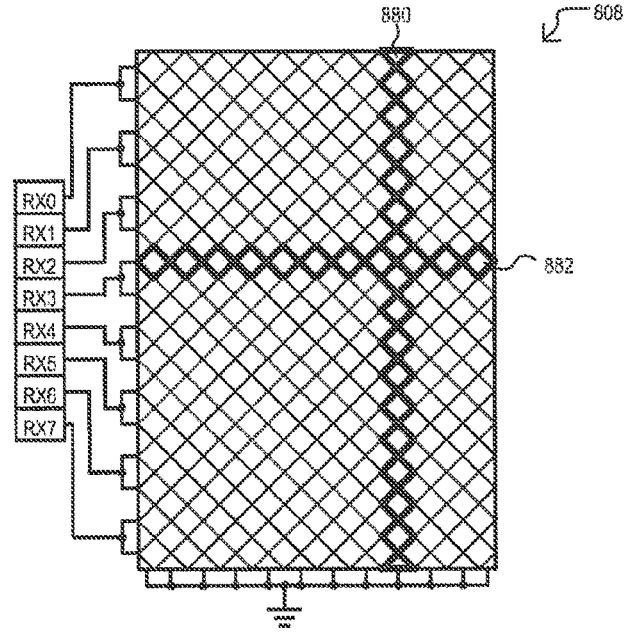
FIGS. 8A and 8B are plan views of a noise listening configurations for a mutual capacitance sense network according to embodiments.
Figure 8B:
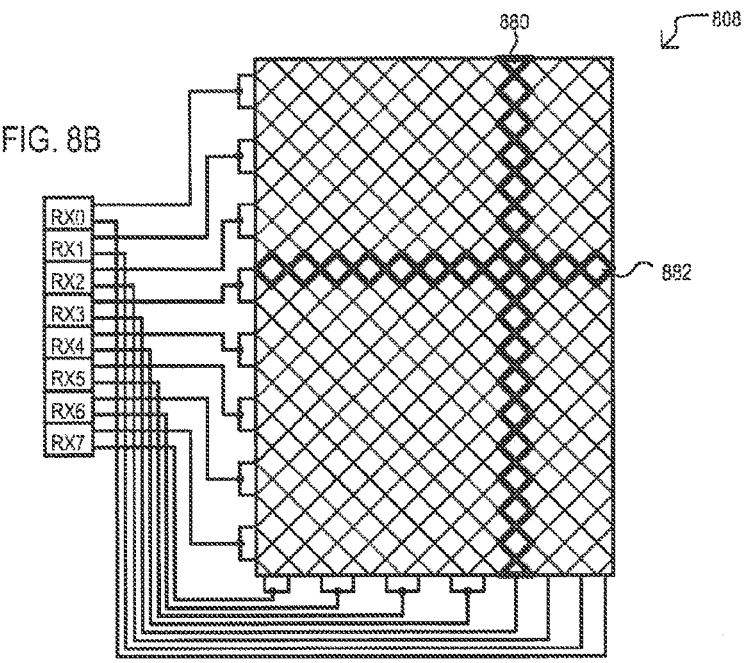

FIGS. 8A and 8B show different noise listening configurations according to embodiments.

FIG. 8A shows a noise listening configuration for a mutual capacitance sense network 808 according to one embodiment. Sense network 808 can include TX electrodes (one highlighted as 880) arranged in one direction and RX electrodes (one highlighted as 882) arranged in another direction. In the embodiment shown, sets of RX electrodes 882 (in this embodiment, sets of two) can be connected to RX paths (RX0 to RX7) for noise listening operations. TX electrodes 880 can be connected to ground.

FIG. 8B shows a noise listening configuration for a mutual capacitance sense network 808 according to another embodiment. Sense network 808 can have the structure shown in FIG. 8A. However, RX electrodes 882 and TX electrodes 880 can be commonly connected to a same RX path. In the particular embodiment shown, RX paths RX0 to RX3 can be connected to two RX electrodes 882 and one TX electrode 880, while RX paths RX4 to RX7 can be connected to two RX electrodes 882 and two TX electrodes 880.

In this way, RX and/or TX electrodes of a mutual capacitance sense network can be connected to capacitance sensing inputs to listen for noise while a TX signal is prevented from being applied to the network.

FIGS. 9A and 9B show listening operations according to embodiments.

FIG. 9A shows a listening operation 900-A having serial noise listening operations. Progression of time is shown by arrow "t". A listening operation 900-A can begin with a listening scanning action 902. Such an action can include acquiring capacitance values across multiple sensors (e.g., electrodes). In particular embodiments, such a step can include establishing connections to a mutual capacitance sense array like that shown in FIG. 8A or 8B. Following a listening scanning 902, acquired values can be subject to listening CMF 904. A listening CMF can include common mode filtering that can filter out noise common to all electrodes and thus help isolate local noise (e.g., external type noise). Filtered sense values can then be subject to a noise detection action 906. Such an action can compare sensed capacitance levels to one or more limits to determine a noise level. Following a noise detection action 906, a listening operation 900-A can repeat, performing another listening scanning action 902.

FIG. 9B shows a listening operation 900-B having pipelined noise listening operations. Progression of time is shown by arrow "t". A listening operation 900-B can begin with a listening scanning action 902-1, which can acquire a first set of raw capacitance values. Following listening scanning operation 902-1, a next listening scanning operation 902-2 can begin. However, while such second scanning action (902-2) is undertaken, the first set of raw data acquired with the first scanning action 902-1 can be common mode filtered 904-1 and subject to noise detection 906-1.

In this way, while raw data is gathered for noise listening on electrodes, previously gathered raw data can be common mode filtered and checked for noise events.

In some mutual capacitance embodiments, that drive TX electrodes with a transmit TX signal (i.e., excitation signal) while RX electrodes provide sense signals via a mutual capacitance, in a listening scanning action (e.g., 902 and/or 902-1), capacitance can be sensed on RX electrodes, but without the TX electrodes being driven with a transmit signal.

FIG. 10 shows a noise listening operation 1000 according to one embodiment in a flow diagram. An operation 1000 can include a scanning initialization 1010. A scanning initialization can configure connections to a sense network to enable the sensing of noise across multiple channels. Such an initialization can include changing sense network configurations from a standard touch sensing configuration to a noise listening configuration.

Once scanning initialization 1010 is complete, an operation 1000 can, in parallel, perform noise scanning 1012 and noise detection 1014. Noise scanning 1012 can include acquiring sense values from electrodes. Noise detection 1014 can include detecting noise from previously acquired sense values. Once noise scanning is complete (Yes from 1016), a noise listening operation 1000 can restore a sense network to a normal state 1018. A normal state can be that utilized for standard sensing operations (e.g., touch sensing).

FIG. 11 shows a scanning initialization operation 1100 according to an embodiment. A scanning initialization operation 1100 can be one particular implementation of that shown as 1010 in FIG. 10. Scanning initialization operation 1100 can be a scanning initialization operation for a mutual capacitance sense network. An operation 1100 can include disabling any circuits utilized in standard scanning operations that could interfere with noise detection (1120). In the embodiment shown, an action 1120 can include turning off current digital-to-analog converters (iDACs) connected to a sense network. RX paths can be configured as high impedance inputs (1122). RX paths can then be connected to input channels (1124). A signal acquisition time (e.g., scan time) can then be set that is suitable for the noise to be detected. In the embodiment of FIG. 11, such an action can include setting a number of sub-conversions (1126) to a predetermined value. All active channels can then be turned on (1128). Such an action can enable electrodes to be connected to capacitance sensing circuits. A scan can then start (1130). Such an action can acquire raw sense values to enable noise to be detected. A scanning initialization operation 1100 can then end.

FIG. 12 shows a restore-to-normal operation 1232 according to an embodiment. A restore-to-normal operation 1232 can be one particular implementation of that shown as 1018 in FIG. 10. Restore-to-normal operation 1232 can include disconnecting all RX paths from input channels (1234). Such RX channels can then be configured for standard sensing operations (1236). A signal acquisition time (e.g., scan time) can then be returned to that utilized for standard sensing operations (1238). In the embodiment of FIG. 12, such an action can include setting a number of sub-conversions. An operation 1232 can include enabling previously disabled circuits utilized in standard scanning operations (1240). In the embodiment shown, an action 1240 can include turning on iDACs. A restore to normal operation 1232 can then end.

Figure 13:
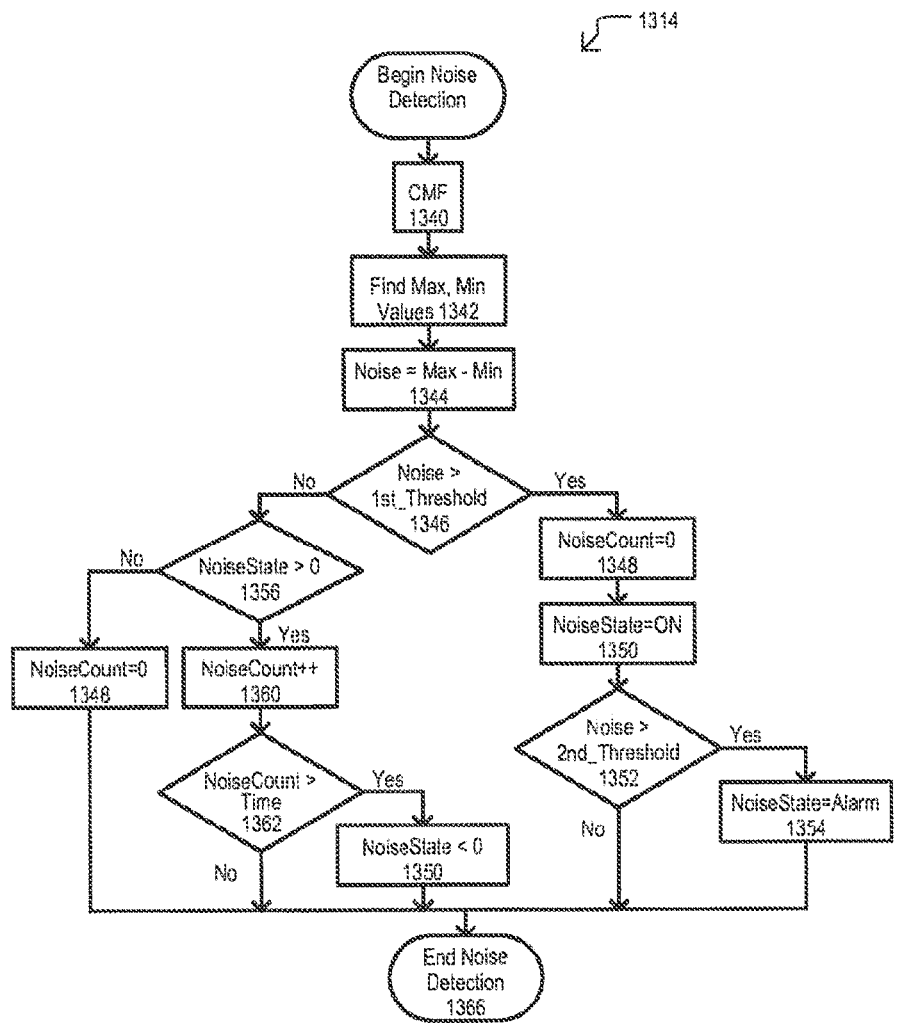
FIG. 13 is a flow diagram of a noise detection operation according to an embodiment.

FIG. 13 shows a noise detection operation 1314 according to an embodiment. A noise detection operation 1314 can be one particular implementation of that shown as 1014 in FIG. 10. A noise detection operation 1314 can include a CMF operation 1340. Such filtering can remove noise common to electrodes and thus can improve a signal from any local noise (i.e., external noise). Operation 1314 can then determine a noise value. In the particular embodiment shown determining a noise value can include finding maximum and minimum values from the CMF filtered values (1342), and then determining the difference between such values (1344).

A noise value can then be compared to a first threshold (1346). If a noise value is above a first threshold (Yes from 1346), a listening timeout value can be reset (1348) and a noise level can be set to a first value (ON) (1350). If noise has been determined to above a first threshold, the noise can also be compared to a second threshold (1352). If a noise value is above a second threshold (Yes from 1352), a noise level can be set to a second value (Alarm) (1354). An operation can then end 1366. If a noise value is below a second threshold (No from 1352), an operation can also end 1366.

If a noise value is not above a first threshold (No from 1346), a noise detection operation 1314 can determine if a noise level should be returned to a zero value (i.e., no noise). In the embodiment shown, if a noise level can be checked to see if it still indicates a high noise state (i.e., ON or Alarm) (1356). If no elevated noise is indicated (No from 1356) a timeout value can be reset (1348). If elevated noise is indicated (Yes from 1356) a timeout value can be incremented (1348). The timeout value can then be compared to a limit (1362). If a timeout value exceeds a limit (Yes from 1362), the noise level can be returned to the no noise state (1350). If a timeout value does not exceed a limit (No from 1362), an operation can end 1366.

Figure 14:
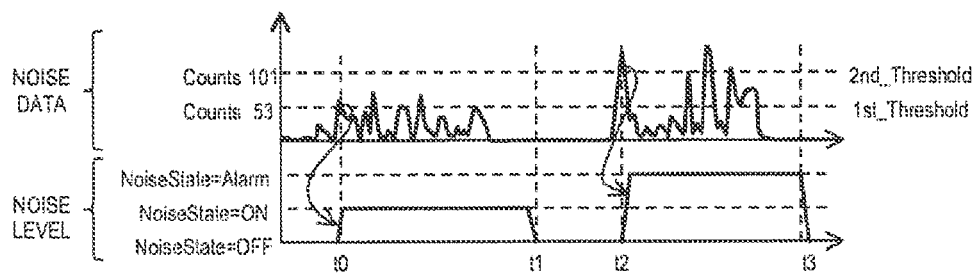
FIG. 14 is a timing diagram showing a noise detection operation that can provide an alarm condition according to an embodiment.

FIG. 14 is a timing diagram showing a noise detection operation according to one embodiment. FIG. 14 includes a waveform NOISE DATA, showing noise sense values acquired by a noise listening operation. Projected onto the NOISE DATA waveform are two noise threshold levels ($1^{st}$_Threshold and $2^{nd}$_Threshold).

FIG. 14 also includes a waveform NOISE LEVEL that shows noise levels determined by a noise detection operation. NOISE LEVEL can indicate three different noise levels. NoiseState=OFF can show noise values below a first threshold ($1^{st}$_Threshold). NoiseState=ON can show noise values above the first threshold ($1^{st}$_Threshold). NoiseState=Alarm can show noise values above a second threshold (2nd_Threshold).

Referring still to FIG. 14, at about time t0, noise values can exceed a first threshold. As a result, a noise detection operation can set a noise level to ON. Eventually, noise levels time out, and at time t1, noise levels can return to an OFF state.

At about time t2, noise values can exceed a second threshold. As a result, a noise detection operation can set a noise level to Alarm. Eventually, noise levels time out, and at time t3, noise levels can return to an OFF state.

Figure 15:
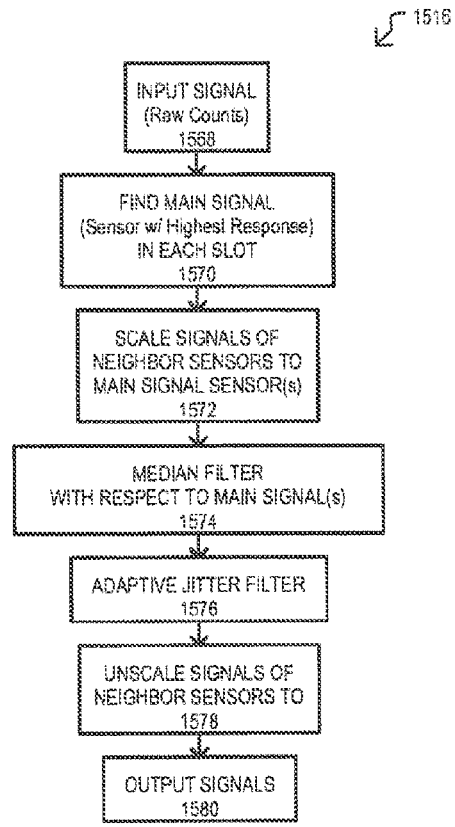
FIG. 15 is a flow diagram of a local noise filtering operation according to an embodiment.

Referring now to FIG. 15, a local noise filtering operation 1516 according to an embodiment is shown in a flow diagram. A local noise filtering operation 1516 can be performed on sense data in the event local (i.e., not common mode) noise levels are determined to exceed a certain level. An operation 1516 can include inputting sense signals (1568). Such an action can include inputting raw count values generated from an ADC connected to sense electrodes.

An operation 1516 can find a main signal (1570). Such an action can locate a potential touch location. As will be recalled, local noise can present around touch locations. In one embodiment, a main signal can correspond to a sensor having a highest response (which would, in the absence of noise, indicate a touch). An operation 1516 can then scale signals from neighboring sensors to the corresponding main sensor signal (1572). Neighbor sensors can be sensors physically proximate to the main sensor. In one embodiment, neighbor sensors can be sensor on opposing sides of a main sensor. A scaling operation can alter a sense value of a neighbor electrode based on how such an electrode varies from the main when a valid touch event occurs.

In one very particular embodiment, scaling can be based on a mean value when a touch is present for an electrode. Sense values for neighboring electrodes can be scaled according to scaling factors as follows:

$$k_A = (B_{Tmean}/A_{Tmean}), k_C = (B_{Tmean}/C_{Tmean})$$

where $k_A$ is a scaling factor for a count value from an electrode A which is a neighbor of an electrode B, $k_C$ is a scaling factor for a count value from an electrode C which is a neighbor of an electrode B opposite electrode A, and $A_{Tmean}$, $B_{Tmean}$, and $C_{Tmean}$ are mean sense values derived from touches to such electrodes.

Following a scaling of neighbor sensors, a median filter can be applied with respect to the main signal (1574). Such an action can include applying a median filter to sense values for electrodes. In one embodiment, a median filter can be applied to sensor signals from three consecutive time periods. A true touch event can provide an increase count value that may be sustained over multiple time periods. In contrast, local noise levels may vary in polarity over time. A median filter operation (e.g., 1574) can be a first type of non-linear filtering that is performed.

An operation 1516 can also include an adaptive jitter filter (AJF) operation (1576). An AJF operation (e.g., 1576) can be another non-linear filter operation. One particular example of an AJF operation is described below in more detail.

Following an AJF operation (1576), a previous scaling operation (e.g., 1572) can be reversed. That is filtered sense values corresponding to neighbor sensors proximate a main sensor can be "unscaled" (1578). A resulting set of sense values can then be output 1580.

Figures 16A, 16B:
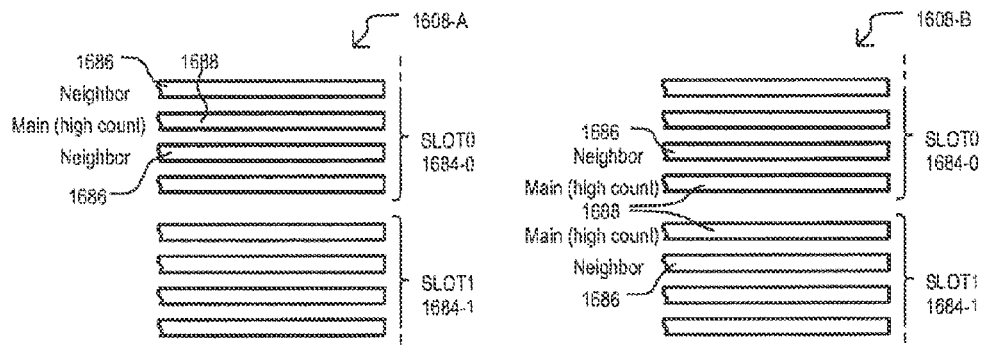
FIGS. 16A and 16B are plan views showing electrode selection for scaling in a filter operation according to an embodiment.

FIGS. 16A and 16B show a determination of a main signal from electrodes according to an embodiment. FIGS. 16A and 16B show electrodes physically arranged into two groups, shown as slots 1684-0/1. A sense operation can sense capacitance values for different slots with different sense operations. In one very particular embodiment, slots 1684-0/1 can be RX electrodes coupled to a same TX electrode(s) by a mutual capacitance.

FIG. 16A shows a sense operation that determines electrode 1688 has a highest response (count in this embodiment). Consequently, such an electrode can be considered a "main" electrode. Electrodes 1686 adjacent to main electrode 1688 can be considered neighbor electrodes. Sense values corresponding to neighbor electrodes 1686 can be scaled with respect to a sense value for main electrode.

FIG. 16B shows a sense operation in which main electrodes 1688 occur on ends of adjacent slots 1684-0/1. In such an arrangement, a neighbor electrode 1686 for each main electrode can be an electrode in a different slot.

Figure 17A:
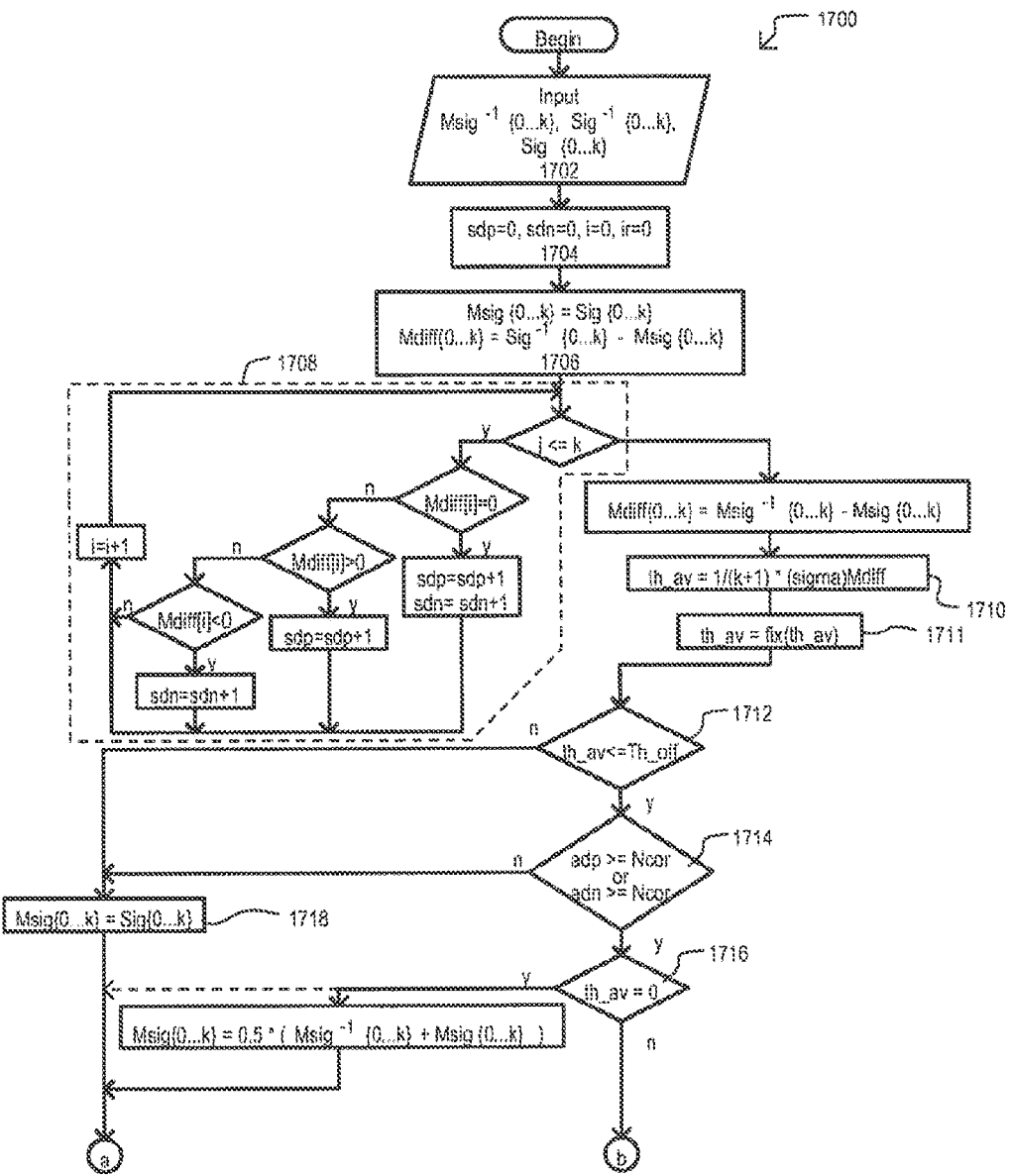
FIGS. 17A and 17B are flow diagrams of an adaptive jitter filter (AJF) according to an embodiment.
Figure 17B:
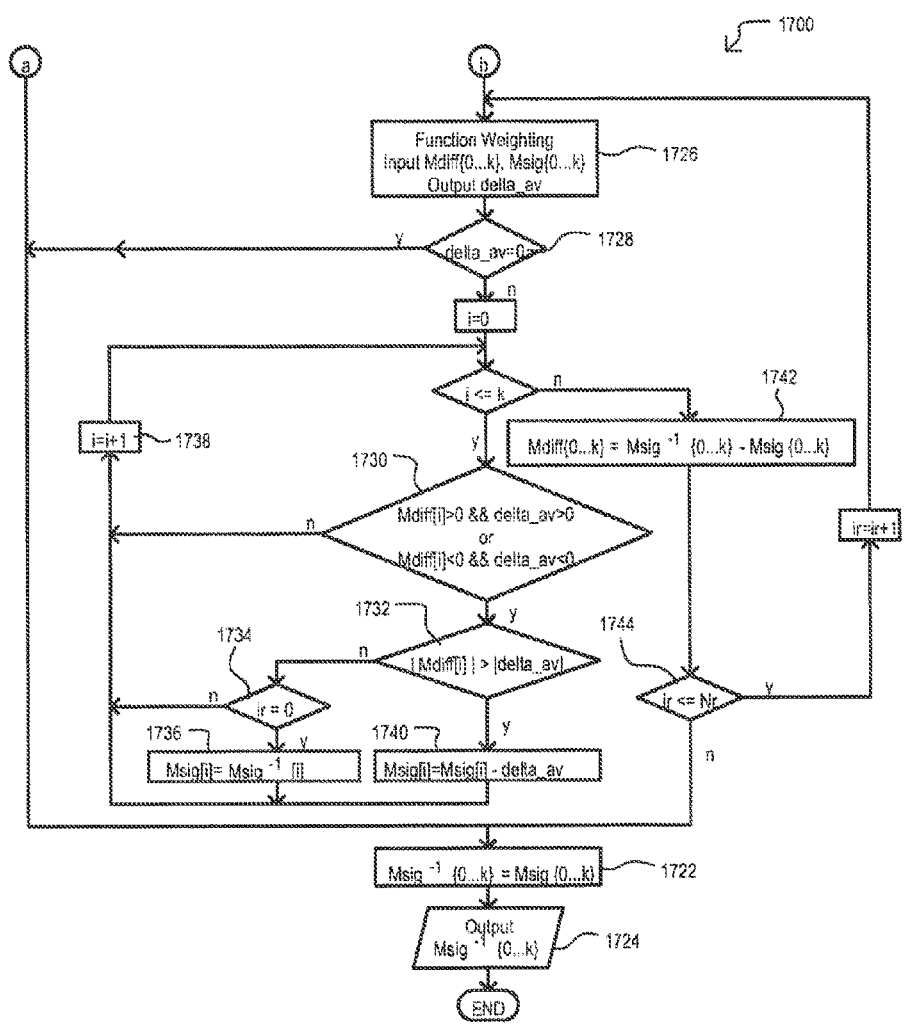

Referring now to FIGS. 17A and 17B, an AJF operation 1700 according to one embodiment is shown in flow diagram. An AJF can be one particular implementation of that shown as 1576 in FIG. 15. An AJF operation 1700 can perform filtering on a subset of electrodes based on average difference of such electrodes over time. FIGS. 17A and 17B are different portions of a flow diagram, with connections between the two shown as circled letters "a" and "b".

Referring first to FIG. 17A, an AJF operation 1700 can include inputting arrays of current signal values, and previously generated filtered signal values (1702). In the embodiment shown, this can include inputting values $Msig^{-1}\{0 \ldots k\}$ which can be previous filtered values generated by an AJF operation 1700 for an electrode set (e.g., a slot), values $Sig^{-1}\{0 \ldots k\}$ which can be previously input sense values for the same electrode set (which in some embodiments can include scaling and/or median filtering), and values $Sig\{0 \ldots k\}$ which can be current input sense values for the same electrode set.

Various values can be initialized to zero, including a positive disparity value sdp, a negative disparity value sdn, and iteration count values i and ir (1704). As will be understood from the discussion below, a positive disparity value sdp can represent the degree of correlation in a positive change from a previous sense value set and current a sense value set. A negative disparity value sdn can represent a same correlation, but in the other (i.e., opposite polarity) direction.

An operation 1700 can determine a difference between previous sense signals and current sense signals (1706). In the embodiment shown, an array $Mdiff\{0 \ldots k\}$ can be created that holds such values (referred to herein as difference values).

An operation 1700 can then generate positive and negative disparity values utilizing such difference values (1708). In the embodiment shown, such an action can include determining if a difference between a previous sense value and its current level is positive, negative, or zero. A positive value will increase a positive disparity for the electrode set. Similarly, a negative value will decrease a negative disparity for the electrode set. In the embodiment shown, no difference in values (zero) can result in both positive and negative disparity values being increased.

Once disparity values have been generated, an operation can then calculate an average sum of the differences between sense signal sets (i.e., current and previous set) (1710). A function "fix" can remove a fractional part of a number (1711). Such an average value is shown as th_av in the embodiment of FIG. 17. If an average difference (th_av) is above a threshold value (n from 1712), filtering can stop, and current set of input values $Sig\{0 \ldots k\}$ can be saved as filter values for a next filter operation and can be output as filtered values (1718, 1722, 1724). Such a threshold check can account from a multi-touch event occurring on the set of electrodes.

If an average difference (th_av) is below a threshold value (y from 1712), disparity values can be compared against correlation limits (1714). If either (i.e., positive or negative) disparity value is sufficiently small (n from 1714) filtering can once again end, with the current set of input values Sig{0 . . . k} can be saved as filter values for a next filter operation and output as filtered values (1718, 1722, 1724).

If an average difference (th_av) is below a threshold value and correlation between sense signal sets is high (y from 1714) an average difference value th_av can be compared against a minimum value (in this case 0) (1716). If there is little difference between sense signal sets (y from 1716), a current signal sense value set and previous filtered sense value set can be averaged to create a current filtered sense value set (1720). This set can be saved as filter values for a next filter operation and output as filtered values (1718, 1722, 1724).

Referring now to FIG. 17B, when an average difference value (th_av) and disparity values are within predetermined ranges, an operation 1700 can call a weighting function 1726. A weighting function can increase sense values when a limited number of sense values in a set exceed a weighing threshold. A weighting function according to one particular embodiment will be described in more detail below. A weighting function can return a weighting value (delta_av) that can be used to weight sense values in a filtered set.

If a weighting function indicates no weighting (i.e., delta_av=0) (y from 1728), filtering can stop, and current set of input values Sig{0 . . . k} can be saved as filter values for a next filter operation and output as filtered values (1718, 1722, 1724).

If a weighting function provides a weighting value (i.e., delta_av≠0) (n from 1728), an operation can selectively weight current sense values based on polarities of a difference value and the weighting value (delta_av). In particular, if a difference value for an electrode has the same polarity as the weighting value (n from 1730), the sense value may not be weighted.

However, if a difference value for an electrode has a different polarity than the weighting value (y from 1730), a magnitude of difference value can be compared to the weighting value (1732). If a magnitude of a difference is less than that of a weighting value (n from 1732), a multi-pass value can be checked to determine if the present operation is an initial pass (1734). If it is an initial weighting pass (n from 1734), an operation 1700 can continue to a next value of the set (1738). However, if it is a follow on weighting pass (y from 1734), a current value can be set to a previous filtered value, and an operation 1700 can continue to a next value of the set (1738). If the magnitude of a difference between sense values is greater than that of a weighting value (y from 1732), the weighting value can be subtracted from the current value (1740), and an operation 1700 can continue to a next value of the set (1738).

When all sense values of a set have been examined for weighting, a difference set can be created from the weighted values (1742). A multi-pass value can then be checked to determine if the present operation is a last pass (1744). If the operation is not a last pass (y from 1744), a weighting function can be called again with the updated values. If the operation is a last pass (n from 1744), a current set of filtered values can be saved as filter values for a next operation and output as filtered values (1718, 1722, 1724).

Figure 18A:
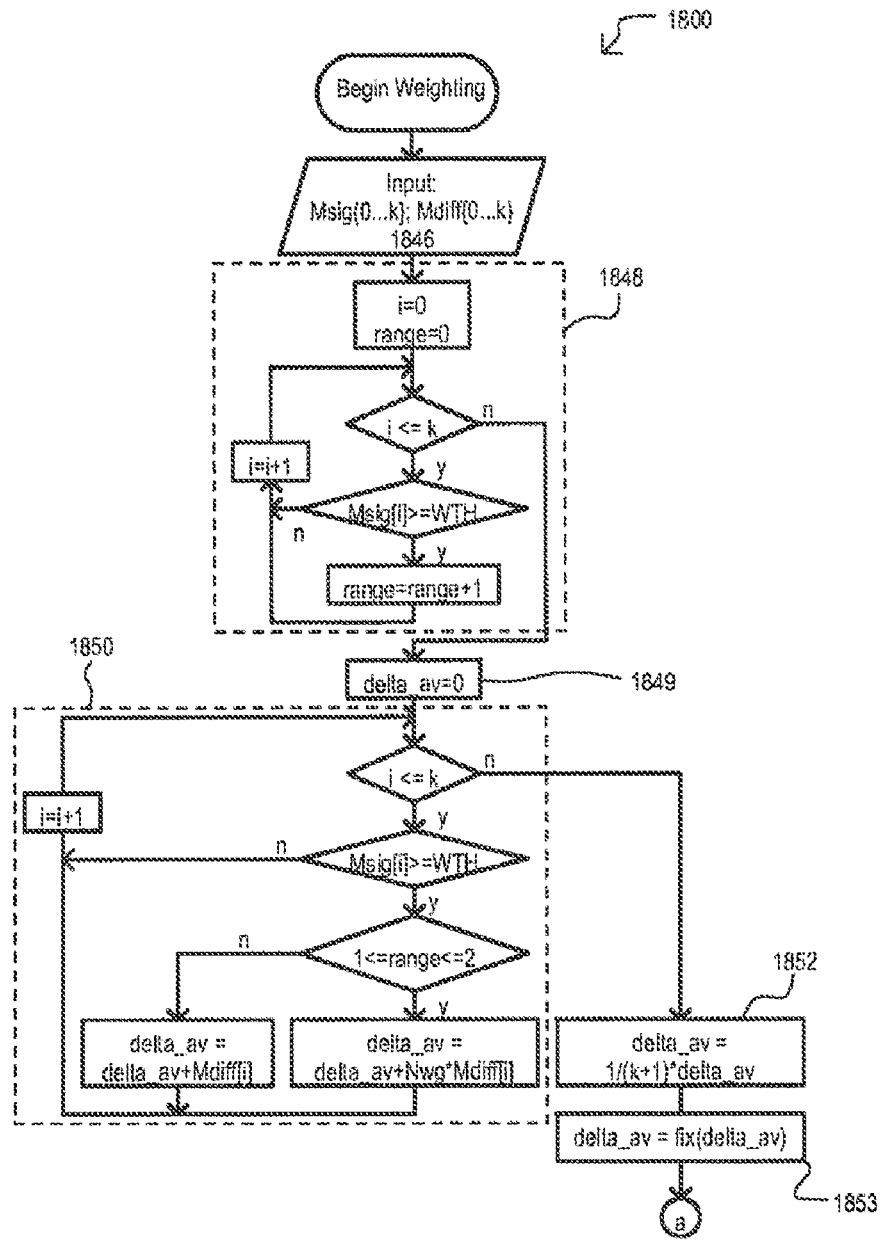
FIGS. 18A and 18B are flow diagrams of a weighting function that can be included in the AJF according to an embodiment.
Figure 18B:
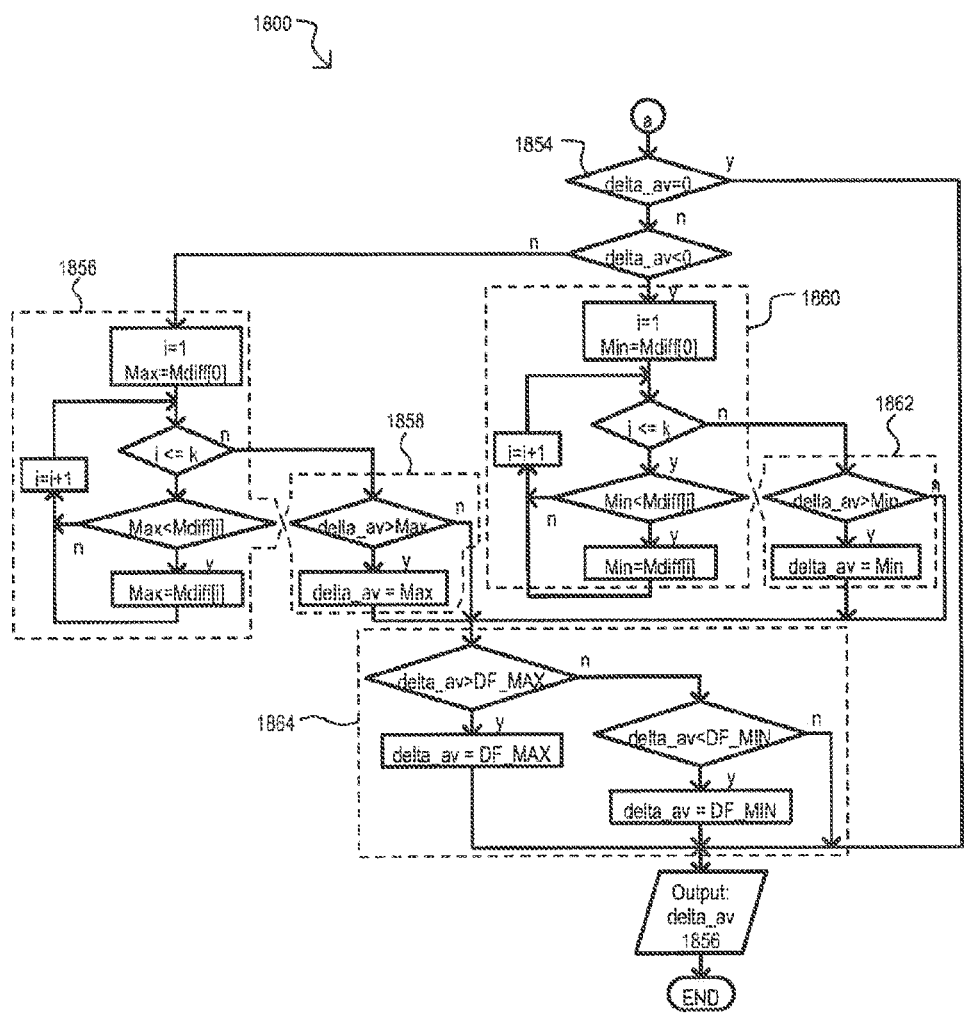

Referring now to FIGS. 18A and 18B, a weighting function 1800 according to one embodiment is shown in flow diagram. A weighting function 1800 can be one particular implementation of that shown as 1726 in FIG. 17. A weighting function 1800 can weight sense values in a set of electrodes when limited numbers of electrodes in the set exceed a weight threshold. FIGS. 18A and 18B are different portions of a flow diagram, with a connection between the two shown as circled letter "a".

Referring first to FIG. 18A, a weighting function 1800 can include inputting current filtered values Msig{0 . . . k} and difference values Mdiff{0 . . . k} (1846). A function 1800 can then examine a filtered value for each electrode in a set to see if it exceeds a weighting threshold (WTH). Each time a sense value exceeds a weighting threshold (WTH) a range value can be incremented (1848). Thus, a range value (range) can represent how many electrodes in a set exceed WTH.

Once a range value is established, a weighting value can be initialized (1849).

Each filtered value can be compared to a weighting threshold (1850). According to such a comparison, components of a resulting weighting value (delta_av) can be increased or decreased depending upon a range value. In the embodiment shown, if a range value outside of some minimum and maximum value (in the embodiment shown, less than or greater than two), a weighting component can be a difference value for the filtered value (delta_av=delta_av+Mdiff[i]). However, if a range value is within a predetermined range (in this embodiment, is "2"), a weighting component can be increased by multiplying by the difference value by a weighting factor (Nwg) (delta_av=delta_av+Nwg*Mdiff[i]).

Once all filtered values have been compared and components for the weighting value added up, an average of the values can be generated 1852. In the embodiment shown, fractional portions of weighting values can then be removed (1853).

Referring now to FIG. 18B, if a weighting value is zero (y from 1854) a weighting function can end, and the weighting value (zero) can be provided as an output weighting value (1856) (for use in the AJF). If a weighting value is positive, a maximum difference value (Max) from the set of difference values can be determined (1856). If a weighting value (delta_av) is greater than a maximum value (Max), the weighting value can be set to the maximum value (1858). In a similar fashion, if a weighting value is negative, a minimum value (Min) from the set of difference values can be determined (1860). If a weighting value (delta_av) is greater than a minimum value (Min), the weighting value can be set to the minimum value (1862).

A weighting value (delta_av) can then be bounded by a high limit value DF_MAX and low limit value DF_MIN (1864). If a weighting value (delta_av) is greater than high limit, it can be set to the high limit. Similarly, if a weighting value (delta_av) is less than low limit, it can be set to the low limit.

The resulting weighting value can then be provided as an output weighting value (1856) (for use in the AJF).

It is understood that FIGS. 17A to 18B show an AJF and weighting function according to a very particular embodiment. Alternate embodiments can realize such operations, or equivalent operation, with other circuits and/or architectures.

Figure 19:
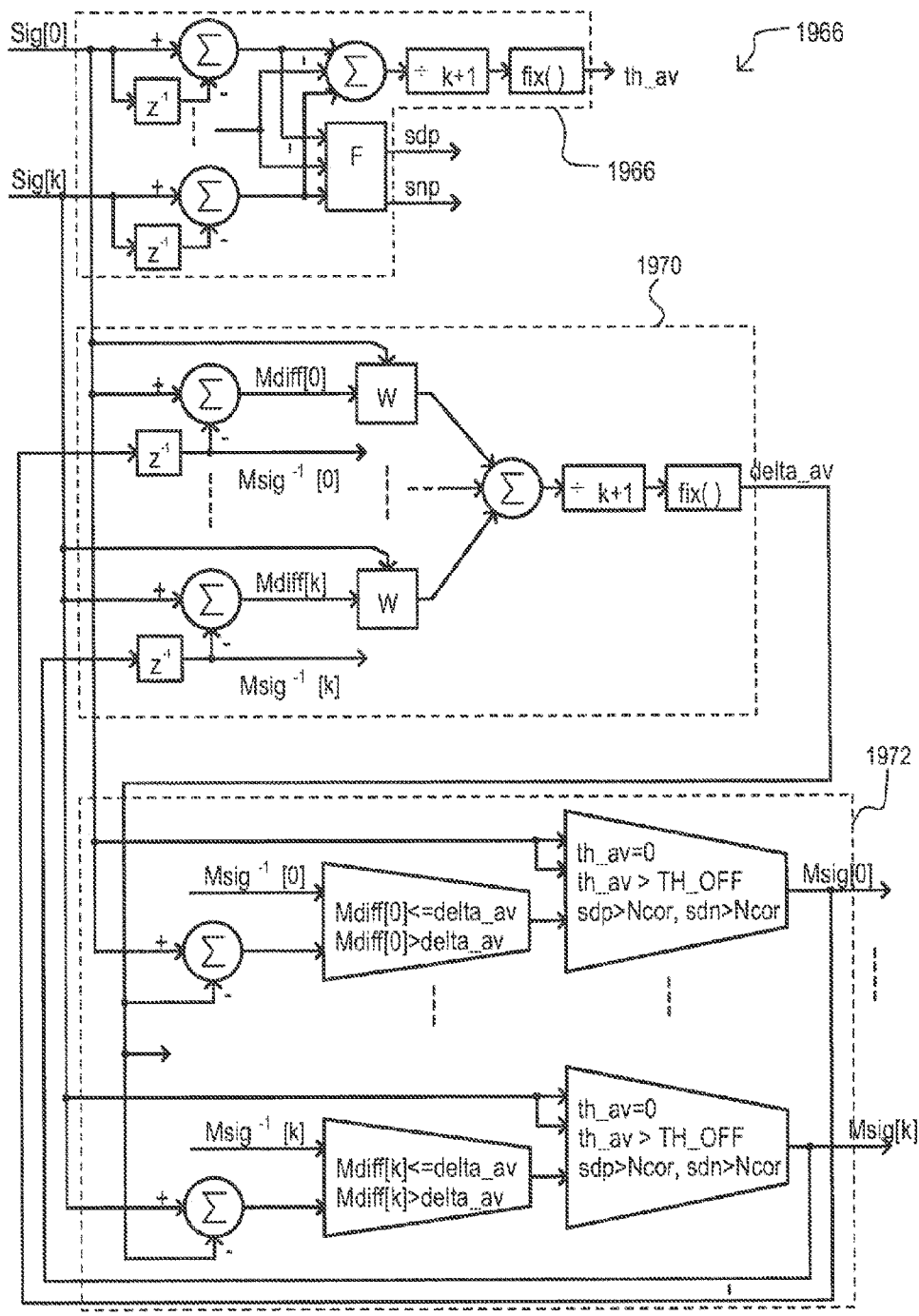
FIG. 19 is a diagram showing an AJF operation another to an embodiment.

FIG. 19 is a flow diagram showing another implementation of an AJF filter and weighting function like that shown in FIGS. 17A to 18B. FIG. 19 shows processing 1900 that includes a first section 1966 that can generate an average difference value (th_av), a positive disparity value (sdp), and negative disparity value (sdn), as described for FIG. 17A. A second section 1970 can generate a weighting value (delta_av) like that described for FIGS. 18A/B. A third section 1968 can generate filter output values as shown in FIG. 17B.

Figure 20:
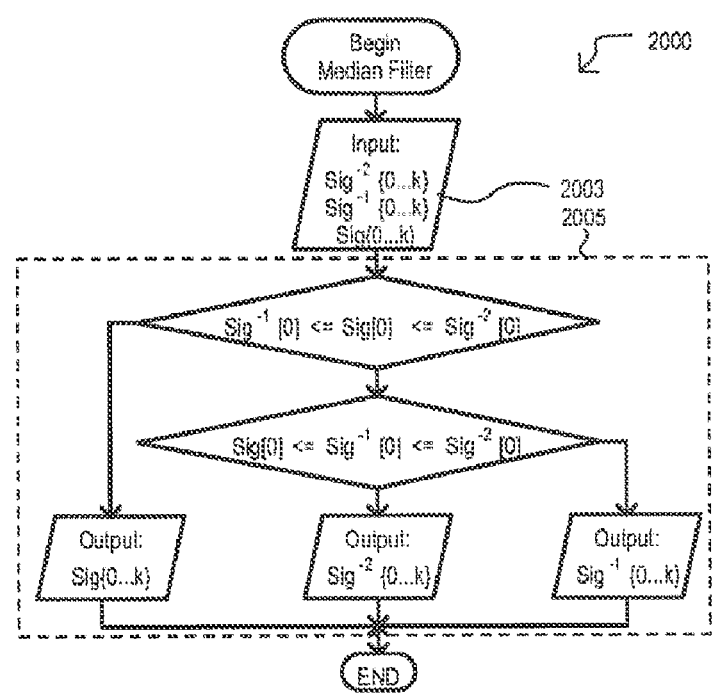
FIG. 20 is a flow diagram of a median filter that can be included in embodiments.

Referring now to FIG. 20, a median filter 2000 that can be included in the embodiments is shown in a flow diagram. A median filter 2000 can include inputting a set of sense values from consecutive sample periods (i.e., a sample window) (2003). In the particular embodiment of FIG. 20, a sample window is three. A median of the three values can be determined, and then provided as an output value (2005).

Embodiments can be utilized in capacitance sense systems to reduce the adverse affects of noise local to a subset of all electrodes, such as that arising from external noise source.

Embodiments can improve capacitance sensing of a device when it is coupled to a charging device by filtering charger noise coupled to a touch object (e.g., finger).

The frequency hoping algorithm described above can be improved upon, possibly improving stability and performance even for noise below 3Vp-p within a range of 1-200 kHz square wave noise. The embodiments described herein may be used to meet device requirements for charger noise. One of the improvements may include modifying a state machine to implement an additional listening method independently checks actual raw counts values on each sensor to decide if a frequency change is needed. Other methods in the embodiments described below may also be used to improve baseline updates for all available configurations to maintain the baselines up to date with possible changes in the device's environment.

Generally, the embodiments described above perform noise listener scanning before normal scanning as illustrated in FIG. 1 and FIG. 2. In order to eliminate the listener's sensitivity to LCD common node noise, a common node filter is applied to the listener data. After filtering, the noise detector defines the noise level (based on thresholds and timeout technique). If charger noise is not detected then the scanning and processing path is not charged, as illustrated in the standard scan 104, 204. The normal scanning (e.g. with 8 sub-conversions) with pipeline filtering, CMF, baseline and difference calculation are typically performed, as shown in 212 and 228 of FIG. 2. If the acceptable charger noise is detected (e.g., Rx channel is not saturated and the system SNR is decreased but it is greater than 1-2) then the normal scanning time is increased (e.g., twice as many conversions or the like), as shown in the extended scan 114, 206. The pipeline filtering (with CMF excluded), may perform median filtering 216-0, non-linear noise filtering 216-1, as well as baseline and difference calculation 228, as illustrated in FIG. 2. If a non-acceptable noise is detected (e.g., Rx channel is saturated and the system SNR is less than 1), then a charger noise alarm flag is defined by the noise alarm 218 and the system tries to solve the problem by charger noise scanning and processing path.

The idea of frequency hopping is to detect the noise which exceeds some threshold and switch to different frequency which has the noise below threshold. If there's no one frequency in a list which meets noise requirements than it will pick the most quiet one and operate on it. The system may listen to the noise and turn on filtering in case of exceeding some other acceptable noise threshold. The combination of noise listening and filtering with frequency hoping can use three different thresholds: 1) a first noise threshold where the noise may be filtered with filters; 2) a second noise threshold where the noise cannot definitively be filtered by standard filters and may benefit from a frequency change; and 3) a third noise threshold where the noise is considered excessive noise and where the flag is sent to the host that the noise cannot be filtered.

Figure 23:
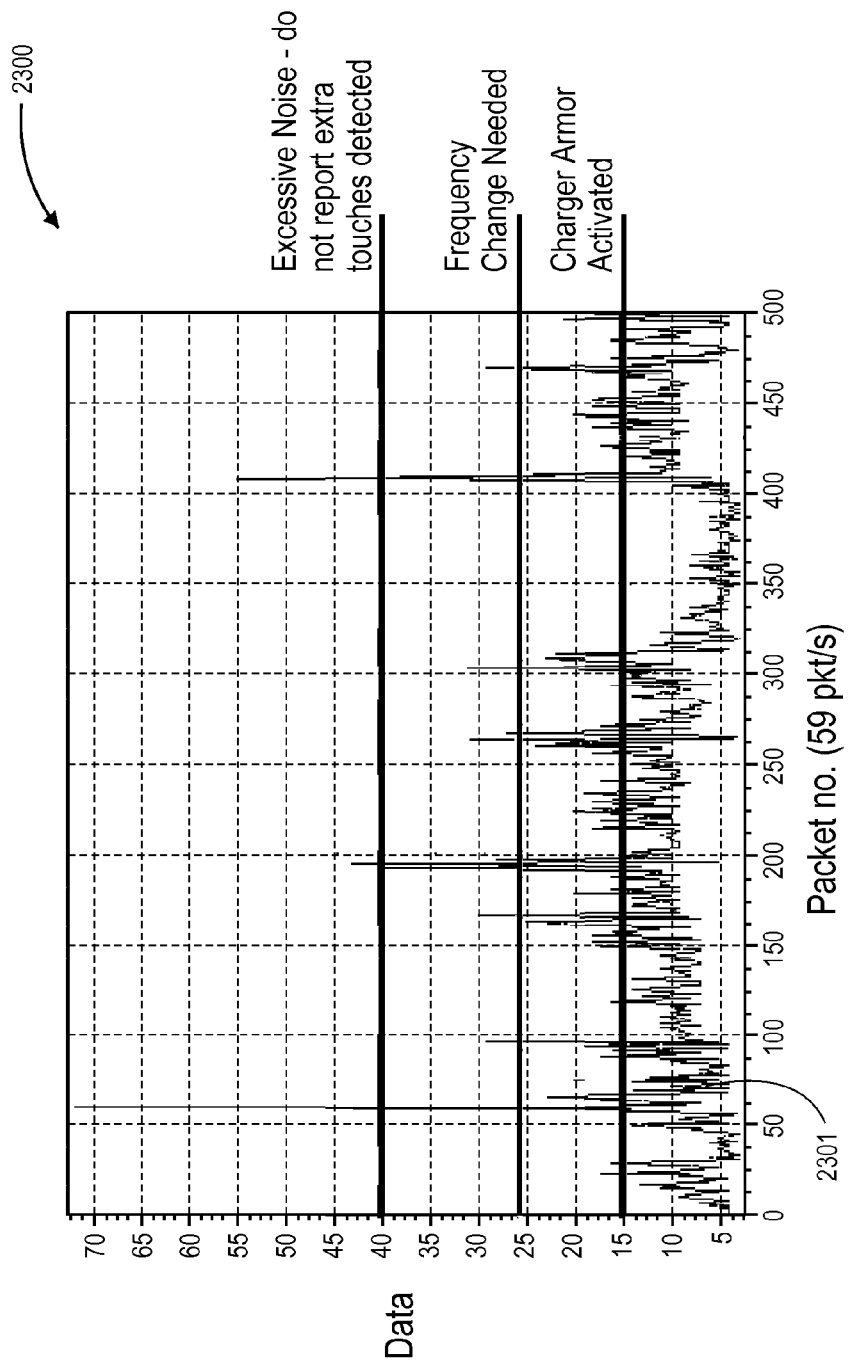
FIG. 23 is a graph of detected noise and three noise thresholds according to one embodiment.

FIG. 23 is a graph 2300 of detected noise 2301 and three noise thresholds 2302-2306 according to one embodiment. The detected noise 2301 is shown as data values (also referred to as counts) in packets being sent to the host. As shown in the FIG. 23, the detected noise 2301 exceeds a first noise threshold 2302 at which charger armor feature is activated. The charger armor feature refers to the different combination of techniques described herein that identify, define, and filter the detected noise on the device. The phrase "charger armor feature" is used as a matter of convenience, but could include any one of the different combination of listening, detecting, and filtering techniques described herein. The detected noise 2301 may also exceed a second noise threshold 2304 at which charger armor filtering is activated and a frequency change is needed. The combination of frequency hopping with the charger armor filtering may result in better noise suppression. The detected noise 2301 may also exceed a third noise threshold 2306 at which the detected noise 2301 is considered excessive noise. The host can ignore the data (e.g., detected touches) during this condition.

Figure 24:
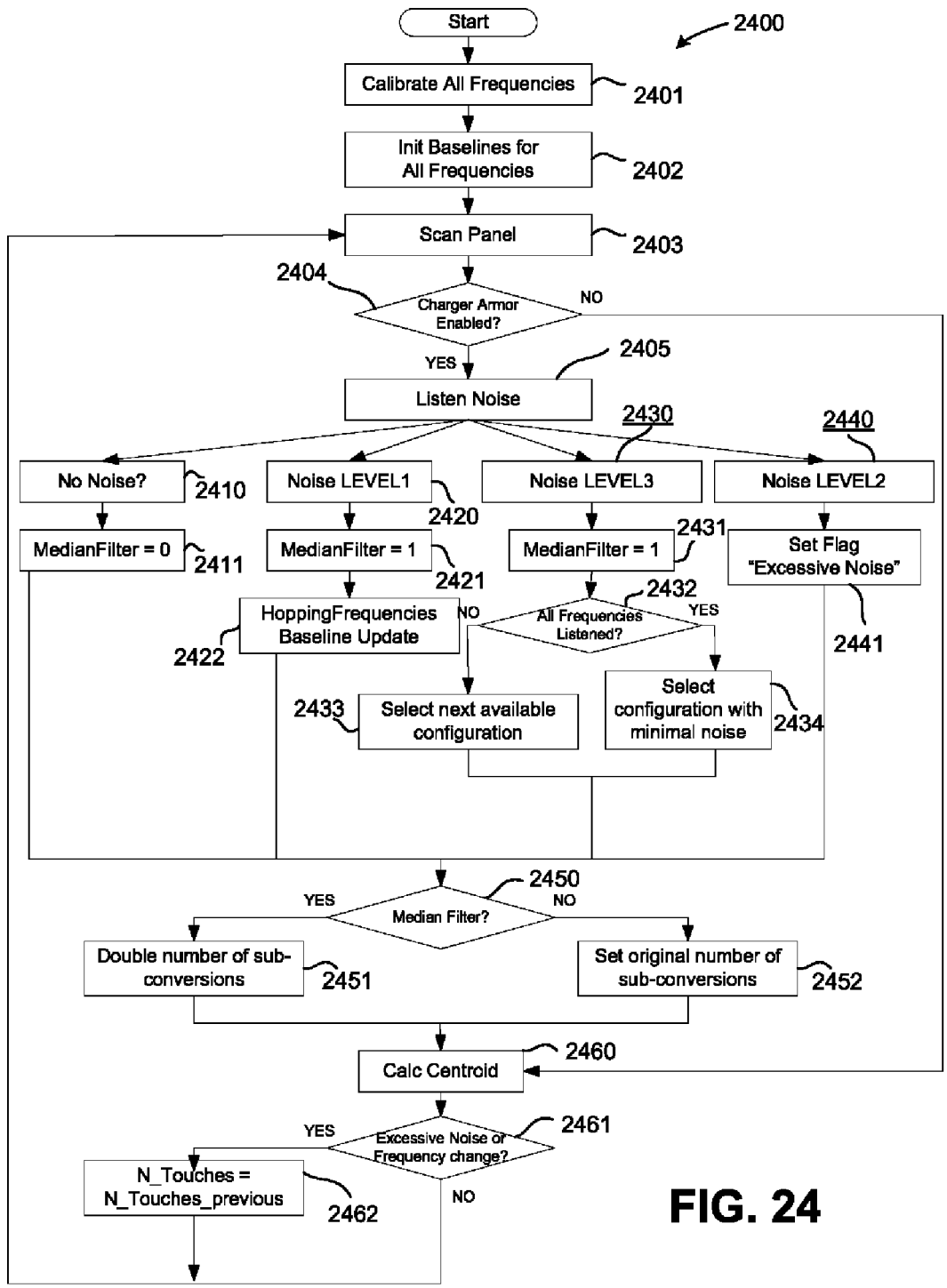
FIG. 24 is a flow chart illustrating a method of noise suppression according to one embodiment.

FIG. 24 is a flow chart illustrating a method 2400 of noise suppression according to one embodiment. The method 2400 may be performed by processing logic that may comprise hardware (circuitry, dedicated logic, etc.), software (such as is run on a general purpose computing system or a dedicated machine), firmware (embedded software), or any combination thereof. In one embodiment, the controller 330, 430, 530 630 of FIGS. 3, 4, 5 and 6 performs some of operations of method 2400. Alternatively, other components of the of the capacitance sensing system 300, 400, 500, and 678 of FIGS. 3, 4, 5, and 6 can perform some or all of the operations of method 2400.

Referring to FIG. 24, the method 2400 begins with calibrating all available frequencies (block 2401), and initializing baselines for those frequencies (block 2402). Next, the processing logic scans the panel (block 2403) at a specified operating frequency. Next, processing logic determines if the charger armor feature of the device is enabled (block 2404). If not, the processing logic proceeds to calculate a centroid (block 2460) as described below. However, if at block 2404 the charger armor feature is enabled, the processing logic listens to the noise (block 2405). The detected noise can be categorized into four levels: 1) "No Noise"—no noise is detected (e.g., noise is below the first noise threshold 2302); 2) "Noise Level 1"—charger armor filter needed (noise is above the first noise threshold 2302); 3) "Noise Level 3"—frequency change is needed (noise is above the second noise threshold 2304); and 4) "Noise Level 2"—excessive noise detected (noise is above the third noise threshold 2306).

If the processing logic determines that the noise is in the "No Noise" level, in which the noise is less than the first noise threshold (block 2410), the processing logic disables a median filter (block 2411). If the processing logic determines that the noise is in the "Noise Level 1" (block 2420), the processing logic enables the median filter (block 2421), and may perform a baseline update on the hopping frequencies (block 2422). If the processing logic determines that the noise is in the "Noise Level 3" (block 2430), the processing logic enables the median filter (block 2421), and determines whether all frequencies have been listened to (block 2432). If not all the frequencies have been listened to at block 2432, the processing logic selects a next available configuration (block 2433). When all the frequencies have been listed to at block 2432, the processing logic selects the configuration with the lowest noise (block 2434). If the processing logic determines that the noise is in the "Noise Level 2" (block 2440), the processing logic sets the flag "Excessive Noise" (block 2441).

Next, the processing logic determines if the median filter is enabled (block 2450). If not, the processing logic sets the original number of sub-conversions (block 2452), as described above in the normal scanning. However, if the median filter is enabled, the processing logic increases the number of sub-conversions (block 2451). For example, the number of sub-conversions can be doubled as described above in the extended scanning.

Next, the processing logic calculates a centroid (block 2560) of the data that may or may not have been filtered. In yet a further embodiment, as depicted, the processing logic can determine if the detected noise is excessive in "Noise Level 2" (block 2440), or the frequency change is needed in "Noise Level 3" (block 2430) (block 2461). If not, the processing logic returns to scan the panel at block 2403. If yes, the processing logic assigns the previous number of touches to a current number of touches (block 2462). This may operate as a debounce feature that may prevent reaction to glitches in the noise due to a single sample having excess noise. Also, the debounce feature may be used to track the number of touches when transitioning to a new frequency.

Figure 25:
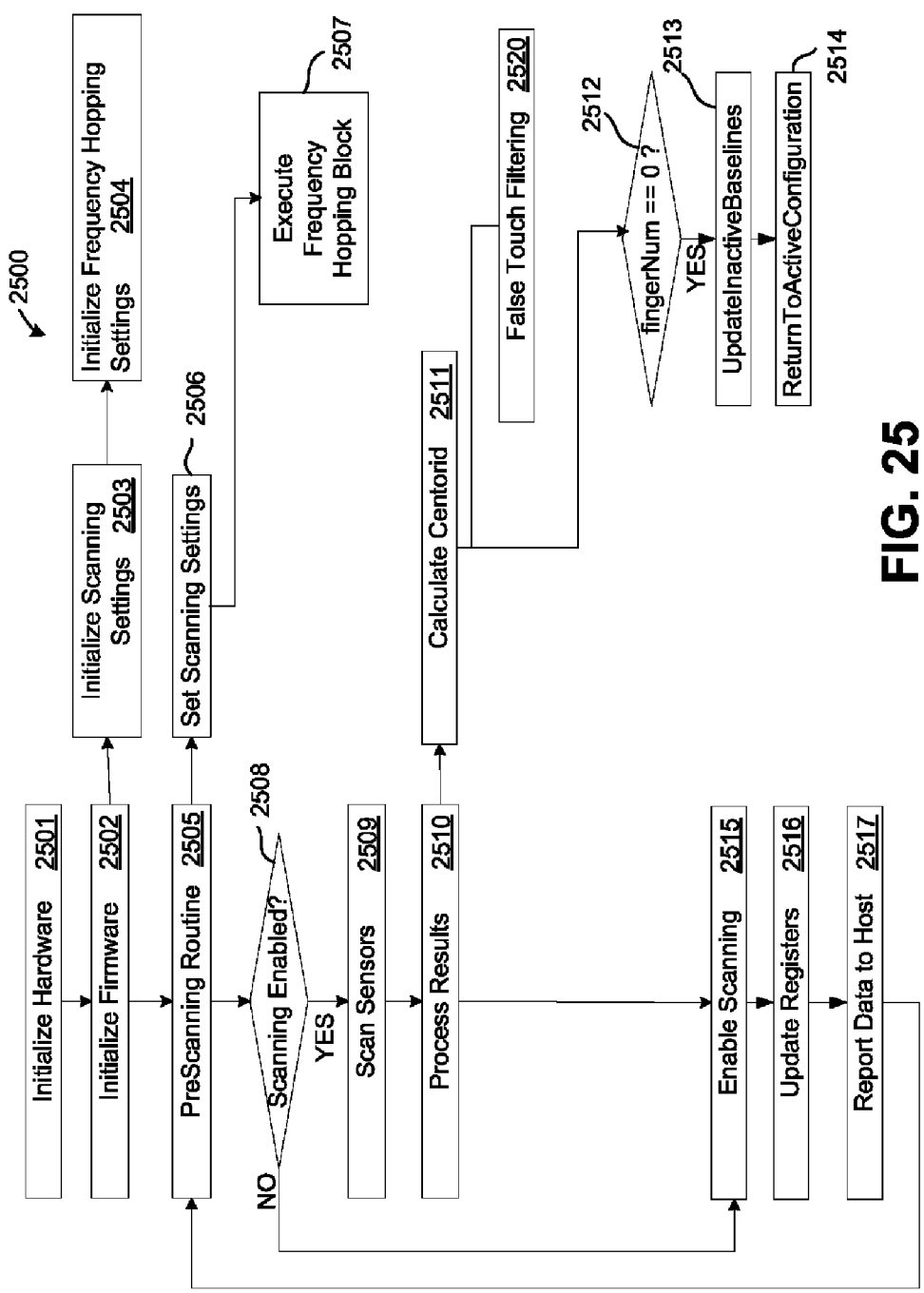
FIG. 25 is a flow chart illustrating a method of noise suppression with frequency hoping and false touch filtering according to one embodiment.

FIG. 25 is a flow chart illustrating a method of noise suppression with frequency hoping and false touch filtering according to one embodiment. The method 2500 may be performed by processing logic that may comprise hardware (circuitry, dedicated logic, etc.), software (such as is run on a general purpose computing system or a dedicated machine), firmware (embedded software), or any combination thereof. In one embodiment, the controller 330, 430, 530 630 of FIGS. 3, 4, 5 and 6 performs some of operations of method 2500. Alternatively, other components of the of the capacitance sensing system 300, 400, 500, and 678 of FIGS. 3, 4, 5, and 6 can perform some or all of the operations of method 2500.

Referring to FIG. 25, the method 2500 begins with initializing hardware (block 2501) and initializing firmware (block 2502). Initializing the hardware may include setting up the circuitry used to scan the electrodes of the sense network, such as the switching circuits, ADC, signal generators, etc. As part of initializing the firmware, the processing logic can assign global variables, initialize scanning settings (block 2503) and initialize frequency hopping settings (block 2504). Initializing the scanning settings at block 2503 may include, for example, setting the number of scanning cycles (e.g., number of sub-conversions) to be performed, which electrodes are to be scanned, a scan order, initialize any variables and thresholds associated with scanning, or the like. Initializing the frequency hopping settings at block 2504 may include, for example, setting the available number of frequencies, variables and thresholds associated with the frequency hoping algorithm, or the like. Next, the processing logic performs a pre-scan routing (block 2505) in which the processing logic sets the scanning settings (block 2506), and executes the frequency hopping algorithm (block 2507). Also, as part of the pre-scanning routine, the processing logic can scan the electrodes to obtain baselines levels for the electrodes. The baselines are measured when there is no touch on the device and are used to determine a change from the baseline (raw data) is above a touch threshold. The pre-scan routing may include other systems operations as would be appreciated by one of ordinary skill in the art having the benefit of this disclosure.

Next, the processing logic determines if the scanning is enabled (block 2508). If not, the processing logic enables the scanning (block 2515), updates the registers (block 2516), and reports data to a host (block 2517), returning to the pre-scan routine at block 2505. When the scanning is enabled at block 2508, the processing logic scans the sensors (block 2509) and processes the results (block 2510). As part of processing the results, the processing logic can determine a difference between the raw counts and the baseline. The raw counts may be a digital value that represents the capacitance measured on the electrodes. Also, as part of processing the results, the processing logic calculates the centroid (block 2511). The centroid may determine a coordinate location of the touch, such as the X/Y coordinates of the touch. This may be reported in terms of pixels, or in terms of a coordinate system mapping of the touch surface. The processing logic may also perform filtering when certain conditions apply, as described herein. In the depicted embodiment, the processing the results at block 2510 include performing false touch filtering (block 2520). Various embodiments of the false touch filtering performed at block 2520 are described below with respect to FIGS. 26-32.

In one embodiment, as part of processing the results, the processing logic may also determine if the number of fingers proximate to the sense network is greater than zero (block 2512). If so, the processing logic updates the inactive baselines (block 2513) and returns to active configuration (block 2514), such as returning to block 2515. The inactive baseline updates may update the baseline values so that they are adjusted for current conditions, such as the noise environment in which the device is currently operating. In one embodiment, a counter may be used for baseline updates. When the counter expires the updates can be designated as inactive and can be updated when there are no touches. The counter value may be a programmable value based on the design specifications.

At block 2515, the processing logic can have an XY position (centroid) or a flag for excessive noise, and can determine if the scanning is enabled (block 2514), can update the registers (block 2516), and report the data to the host (block 2517). In one embodiment, the processing logic sends an interrupt to the host to let a driver of the operating system of the host know that there is new data. In the interim, the processing logic can return to the pre-scanning routine at block 2505 to perform another scan. In short, the method can check for noise, scan, calculate a position, and report to the host over and over while the method is operating.

It should be noted that in one embodiment, the method 2500 is performed without blocks 2504, 2507, 2512, 2613, and 2514, as described above. In another embodiment, the method 2500 is performed with blocks 2504 and 2507, but without blocks 2512-2514. In another embodiment, the method 2500 is performed with blocks 2512-2514 and without blocks 2504 and 2507. In another embodiment, the false touch filtering may be performed in other applications that do not perform frequency hopping performed at block 2507 as would be appreciated by one of ordinary skill in the art having the benefit of this disclosure.

The flow chart of FIG. 25 shows how the frequency hopping algorithm and the false touch filtering can be implemented in the architecture of a capacitive touch screen controller. In one embodiment, the capacitive touch screen controller is the TrueTouch® capacitive touchscreen controllers, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touchscreens up to 5 inches, supports leading operating systems, and is optimized for low-power multi-touch gesture and all-point touchscreen functionality. Alternatively, the frequency hopping features may be implanted in other touchscreen controllers, or other touch controllers of touch sensing devices. In one embodiment, the frequency hopping features may be implanted with the charger armor features for better noise suppression, such as from chargers.

In one embodiment, the processing logic receives, from the electrodes, data representing capacitances of sense elements. Sense elements are intersections between the electrodes, such as one or more TX electrodes and one RX electrode. The processing logic processes the data to identify activated sense elements from the sense elements of the sense networks. The processing logic filters the data to remove false touch events based on a spatial relationship of activated sense elements. The spatial relationship can be used to distinguish false touches and actual touches. For example, the nature of false touches usually is that a local maximum is a big spike caused by noise and most of the adjacent sense elements have no data (zero) or one or two sense elements have low magnitude values. The nature of actual touches is that a local maximum is a big spike caused by the touch object and adjacent sensors (more than two) also have magnitude values (non-zero values), such as described and illustrated with respect to FIG. 27.

In one embodiment, the processing logic identifies a local maximum from among the activated sense elements, identifies a set of adjacent sense elements that are adjacent to the local maximum, and distinguishes between an actual touch and a false touch based on the capacitances of the set of adjacent sense elements. In another embodiment, the processing logic processes the data by identifying a local maximum from among the activated sense elements and calculating a sum of magnitude values of the activated sense elements. The filtering done by the processing device in this embodiment includes comparing the sum against a threshold value to distinguish between an actual touch and a false touch. In another embodiment, the processing logic identifying a local maximum from among the activated sense elements, calculating a sum of magnitude values of the activated sense elements, and subtracting a magnitude value of the local maximum from the sum. Like above, the processing logic filters the data by comparing the sum against a threshold value to distinguish between an actual touch and a false touch.

In another embodiment, the processing logic identifies a local maximum from among the activated sense elements, identifies a set of adjacent sense elements that are adjacent to the local maximum, and calculating a sum of magnitude values of the set of adjacent sense elements. In this embodiment, the processing logic filters the data by comparing the sum against a threshold value to distinguish between an actual touch and a false touch.

In one embodiment, the processing logic identifies the set of adjacent sense elements includes identifying a three-by-three square of sense elements around the local maximum. In yet a further embodiment, the processing logic determines whether the local maximum is located at a corner of the sense network and identifies three or more adjacent sense elements for the set when the local maximum is located at the corner of the sense network. In another embodiment, the processing logic determines whether the local maximum is located at an edge of the sense network, and identifies five or more adjacent sense elements for the set when the local maximum is located at the edge of the sense network.

In another embodiment, the processing logic determines whether the local maximum is located at a corner of the sense network. When the local maximum is located at the corner of the sense network, the processing logic identifies three adjacent sense elements for the set when the local maximum is located at the corner of the sense network and identifies three or more virtual sense elements for the set when the local maximum is located at the corner of the sense network. The processing logic mirrors the magnitude values of the three adjacent sense elements for the magnitude values of the three or more virtual sense elements. The processing logic calculates the sum by adding the magnitude values of the three adjacent sense elements and the magnitude values of the three or more virtual sense elements.

In another embodiment, the processing logic determines whether the local maximum is located at an edge of the sense network. When the local maximum is located at the edge of the sense network, the processing logic identifies five adjacent sense elements for the set when the local maximum is located at the edge of the sense network and identifies three or more virtual sense elements for the set when the local maximum is located at the edge of the sense network. The processing logic mirrors the magnitude values of the three adjacent sense elements for the magnitude values of the three or more virtual sense elements. The processing logic calculates the sum by adding the magnitude values of the three adjacent sense elements and the magnitude values of the three or more virtual sense elements.

In other embodiments, the processing logic identifies multiple local maximums. For each of the local maximums, the processing logic repeats the operations described above to identify the adjacent sense elements to each of the local maximums, calculates the sums of the magnitude values, and compares the sum against a threshold value to distinguish between an actual touch and a false touch.

The embodiments described herein may be used for false touches elimination in a presence of charger noise in capacitive sensing systems. For example, when the charger is plugged in to the device, the charger may cause a lot of noise specifically along the receiving (RX) electrodes, causing false touches. The embodiments described herein of the false touch filtering analyze raw data on the surrounding sensors near a local maximum of the detected touch and determines whether this is a real touch or a false touch. If the touch is determined as false it is removed from report to a host device. The embodiments described herein may analyze input data in potentially noisy areas of the sense array and may remove output data from reporting data that is treated as a noise after the analysis. The input data can be summed and compared to a threshold value that represents an actual touch. Alternatively, other techniques may be used to distinguish between actual touches and false touches as would be appreciated by one of ordinary skill in the art having the benefit of this disclosure. Previous solutions use a common mode signal and apply general filters to input data. However, some localized noise, such as charge noise, is a type of noise that is distributed locally in touch areas. This type of noise, however, may reduce effectiveness of the common mode filters. The previous filters attempt to filter the input data to get clearer results of actual touches. The embodiments described herein may reject output data by analyzing the output data and not modifying the input data.

In one embodiment, the capacitive sensing device contains rows and columns of electrodes, such as in a capacitive sense array. A capacitive sense element can be made up of an intersection of a TX electrode (row or column) and a RX electrode (column or row). The intersections are sometimes referred to as sensors. As a result of measuring mutual capacitance in between each of TX and RX intersection, a controller may receive a matrix of measured raw counts representing the capacitances of the mutual capacitances of the intersections. The size of the matrix may be for example N_Columns*M_Rows. When a conductive object, such as a finger or a stylus, is placed on the capacitive sense array the conductive object reduces the mutual capacitance between the sense elements underneath the conductive object and the controller registers this change in capacitance. This change may be converted to a number and is stored in a resulting matrix. If this measured value exceeds a defined touch threshold, the controller reports a touch. However, there may be different types of noise that are present in capacitive sensing systems and may impact the measured raw counts, such as illustrated in FIG. 26.

Figure 26:
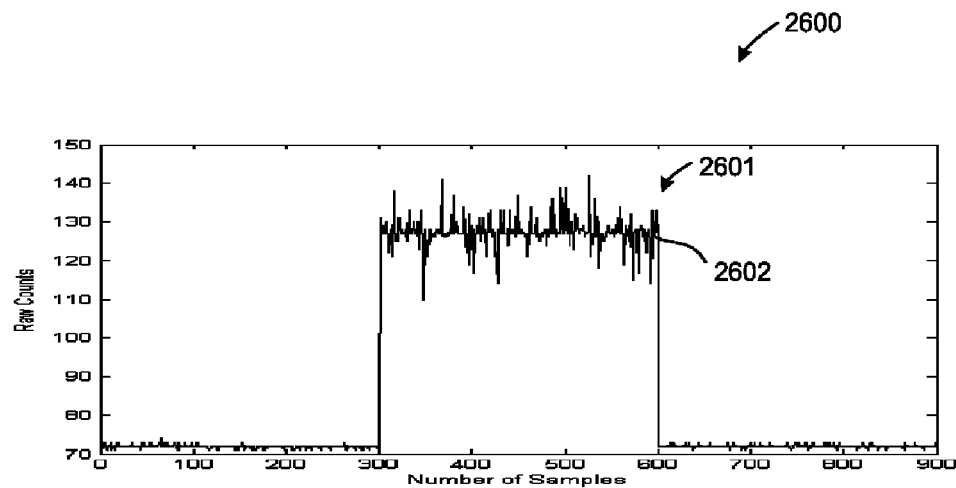
FIG. 26 is a graph of a signal during a touch event with noise according to one embodiment.

FIG. 26 is a graph 2600 of a signal during a touch event 2601 with noise 2602 according to one embodiment. The signal of FIG. 26 is shown as raw counts over a number of samples. The signal increases in raw counts to indicate a touch event 2601. The touch event 2601 introduces the noise 2602. One of the possible noise types for the noise 2602 may be charger noise which is sort of common mode noise. Common mode noise is created in chargers through the use of flyback transformers as part of the regulation circuit used to create both isolation and efficiency. The charger noise may manifest as the ground and power of a mobile device that fluctuates relative to ground. For example, a human finger may be at approximately earth ground potential but the charger isolates the device for safety. So the device, when plugged in to the external impulse charger, may moves relative to the finger's potential. When the touch event happens, the finger may inject noise at the point of contact of the touch event, but with the signal phase and magnitude not aligned with normal sensing. Since the coupled charge is not dependent on a local TX signal, the coupled charge may inject charge for all intersections coupled to the associated touched RX and TX line(s) instead of just those intersections where the finger actually touches.

Figure 27:
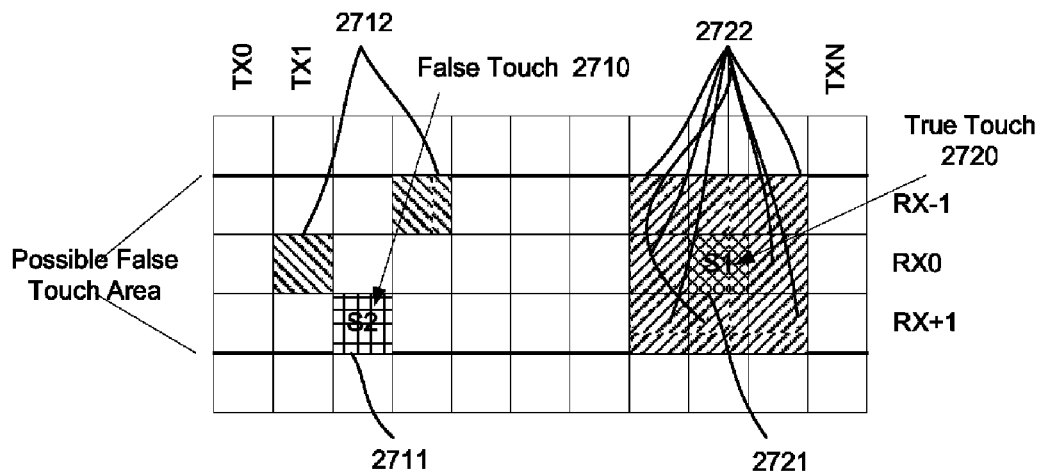
FIG. 27 illustrates a false touch and an actual touch on common receive sense elements according to one embodiment.

In one embodiment, the false touch filtering is implemented in a filter circuit or as a filtering routine. The false touch filtering may be referred to as Z-Coordinate Filter or RX Line Filter. The false touch filtering may identify possible false touches on an activated RX sense element (touched) and its neighboring sense elements. The false touch filtering may eliminate those that are more likely false from reporting to the host device. As illustrated in FIG. 27, the nature of false touches usually is that the local maximum is a big spike caused by the noise and surrounding sense elements or at least most of them are low in magnitude. Real touch usually affects surrounding sense elements and these surrounding sense elements have non-zero magnitudes. The false touch filtering may be used to reduce false touch events due to charger noise, but the false touch filtering may be used for any types of noise, such as noise that has a spike in noise, or an abnormal distribution.

FIG. 27 illustrates a false touch 2710 and an actual touch 2720 on common receive (RX) sense elements according to one embodiment. The actual touch 2720 has a local maximum S1 2721 and a set of adjacent sense elements 2722 that are activated by a touch. The false touch 2710 has a local maximum S2 2711 and two sense elements 2712 that are activated. Although the local maximum S2 2711 may have a high magnitude value, thus, triggering a possible touch, the other sense elements 2722 are only two activated sense elements that are near the local maximum S2 2711. The spatial relationship of the local maximum S2 2711 suggest that the touch is a false touch. For example, the spatial relationship suggests that the touch is not evenly distributed among the local maximum and adjacent sense elements. The sum of the magnitude values of the false touch 2710, when calculated, is much smaller than a sum of the magnitude values of the set of adjacent sense elements 2722 for the actual touch 2720. The sum of the set of adjacent sense elements 2722 may be greater than a specified threshold, thus, indicating a touch event; and the sum of the sense elements 2712 of the false touch 2710 may be less than the specified threshold, thus, indicating a false touch event.

Figure 28:
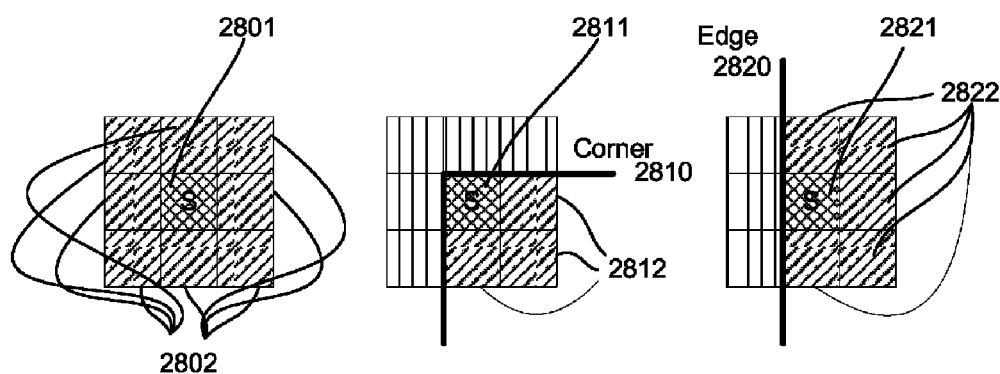
FIG. 28 illustrates a three-by-three square Z magnitude calculation of an actual touch, an actual touch at a corner of the sensor network, and an actual touch at an edge of the sense network according to one embodiment.
Figure 29:
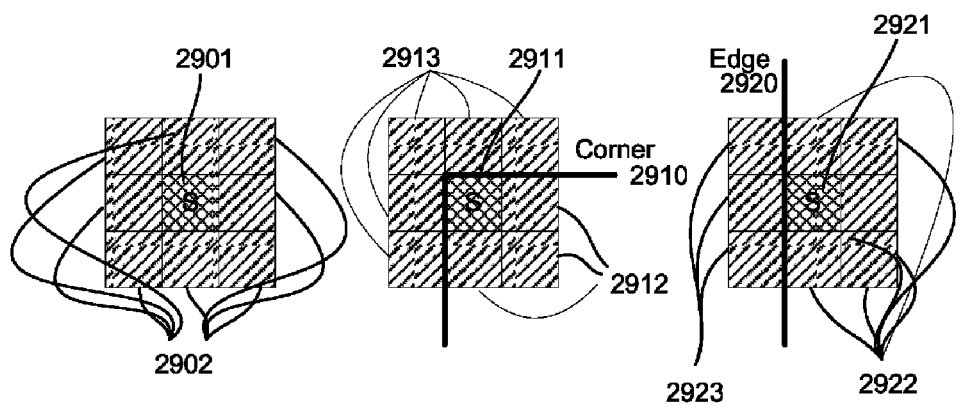
FIG. 29 illustrates a three-by-three square Z magnitude calculation of an actual touch, an actual touch at a corner of the sensor network, and an actual touch at an edge of the sense network using virtual sensors according to one embodiment.

In one embodiment, the false touch filtering calculate a sum of adjacent sense elements in a three-by-three square around a local maximum as illustrated in FIGS. 28 and 29. In one embodiment, the sum includes the magnitude value of the local maximum. In another embodiment, the sum excludes the magnitude value of the local maximum. In some embodiments, the local maximum may be at an edge of the sense network or at a corner, as illustrated in FIG. 29. In these embodiments, the sum may include the magnitude values of the adjacent sensors, such as the remaining three sense elements when the local maximum is at a corner or the remaining five sense elements when the local maximum is at an edge.

FIG. 28 illustrates a three-by-three square Z magnitude calculation of an actual touch 2801, an actual touch 2811 at a corner 2810 of the sensor network, and an actual touch 2821 at an edge 2820 of the sense network according to one embodiment. The actual touch 2801 is represented by a local maximum and a three-by-three square of sense elements 2802 disposed around the local maximum. The sum may be calculated using the magnitude values of the sense elements 2802. Alternatively, the sum may be calculated using the magnitude values of the sense elements 2802 and the local maximum. The magnitude value of the local maximum may or may not be subtracted from the sum before comparing the sum to the threshold value to distinguish between a touch and a false touch.

When the actual touch 2811 is at the corner 2810, the actual touch 2811 is represented by the local maximum and the three remaining sense elements 2812. The boxes outside the corner 2810 are not sense elements and do not have magnitude values. The sum may be calculated using the magnitude values of the three sense elements 2812. Alternatively, the sum may be calculated using the magnitude values of the three sense elements 2812 and the local maximum. Like above, the magnitude value of the local maximum may or may not be subtracted from the sum before comparing the sum to the threshold value to distinguish between a touch and a false touch.

When the actual touch 2821 is at the edge 2820, the actual touch 2821 is represented by the local maximum and the five remaining sense elements 2822. The boxes outside the edge 2820 are not sense elements and do not have magnitude values. The sum may be calculated using the magnitude values of the five sense elements 2822. Alternatively, the sum may be calculated using the magnitude values of the five sense elements 2822 and the local maximum. Like above, the magnitude value of the local maximum may or may not be subtracted from the sum before comparing the sum to the threshold value to distinguish between a touch and a false touch.

In some embodiments, the efficiency of the false touch filtering can be improved by using one or more virtual sensors for the Z magnitude calculation when local maximum is detected on the edge or in the corner, as illustrated in FIG. 29.

FIG. 29 illustrates a three-by-three square Z magnitude calculation of an actual touch 2901, an actual touch 2911 at a corner 2910 of the sensor network, and an actual touch 2921 at an edge 2920 of the sense network using virtual sensors according to one embodiment. The actual touch 2901 is represented by a local maximum and a three-by-three square of sense elements 2902 disposed around the local maximum. The sum may be calculated using the magnitude values of the sense elements 2902. Alternatively, the sum may be calculated using the magnitude values of the sense elements 2902 and the local maximum. The magnitude value of the local maximum may or may not be subtracted from the sum before comparing the sum to the threshold value to distinguish between a touch and a false touch.

When the actual touch 2911 is at the corner 2910, the actual touch 2811 is represented by the local maximum, three remaining sense elements 2912, and five virtual sensors 2913. Unlike the boxed outside the corner 2810 of FIG. 28, the boxes outside the corner 2910 are virtual sense elements 2913. The virtual sense elements 2913 are not physical electrodes, but represent sense elements as if the local maximum were not at the corner 2910. The virtual sense elements 2913 have mirrored magnitude values of the three remaining sense elements 2912 through the local maximum. The sum may be calculated using the magnitude values of the three sense elements 2912 and the virtual sense elements 2913. Alternatively, the sum may be calculated using the magnitude values of the three sense elements 2912, the virtual sense elements 2913, and the local maximum. Like above, the magnitude value of the local maximum may or may not be subtracted from the sum before comparing the sum to the threshold value to distinguish between a touch and a false touch.

When the actual touch 2921 is at the edge 2920, the actual touch 2921 is represented by the local maximum, the five remaining sense elements 2922, and three virtual sense elements 2923. Unlike the boxed outside the edge 2920 of FIG. 29, the boxes outside the edge 2920 are virtual sense elements 2923. The virtual sense elements 2923 are not physical electrodes, but represent sense elements as if the local maximum were not at the edge 2920. The virtual sense elements 2923 have mirrored magnitude values of three of the sense elements 2922 through the local maximum. The sum may be calculated using the magnitude values of the five sense elements 2922 and the virtual sense elements 2923. Alternatively, the sum may be calculated using the magnitude values of the five sense elements 2922, the virtual sense elements 2923, and the local maximum. Like above, the magnitude value of the local maximum may or may not be subtracted from the sum before comparing the sum to the threshold value to distinguish between a touch and a false touch.

In one embodiment, the non-physical, virtual sensors outside of a panel boundary contain magnitude values that are mirrored from the sense elements through the center sense element (identified as a local maximum). For example, a touch at the edge has the virtual sense elements outside of the panel boundary and a touch at a corner has five virtual sense elements outside the panel boundary. The magnitude of the bottom right sense element of the sense elements 2912 may be mirrored to the top right sense element of the virtual sense elements 2913. The magnitude of the middle right sense element of the sense elements 2912 may be mirrored to the middle left sense element of the virtual sense elements 2913. The magnitude of the middle bottom sense element of the sense elements 2912 may be mirrored to the middle top sense element of the virtual sense elements 2913. Similarly, the magnitude values of the sense elements 2922 may be mirrored to the virtual sense elements 2923 when the touch 2921 is detected at the edge 2920. These mirrored values may be used with the magnitude values of the active sense elements for the Z magnitude even when the touch is detected at an edge or at a corner. It should be noted that the depicted embodiments illustrate a touch at a top right corner and a right side. In other embodiments, the false touch filtering can be used for touches at other corners and at other sides as would be appreciated by one of ordinary skill in the art having the benefit of this disclosure.

Figure 30B:
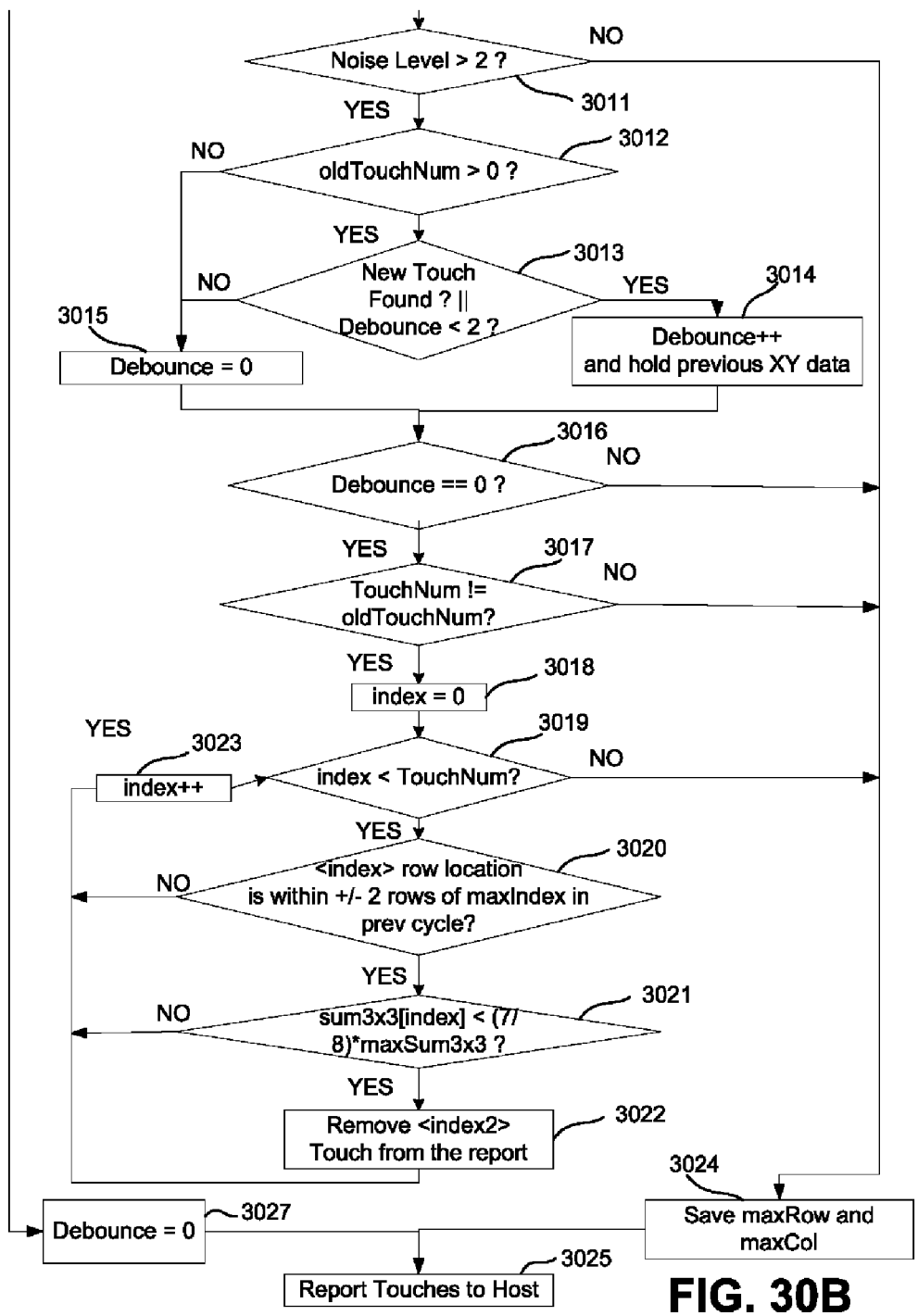

FIGS. 30A and 30B are flow charts illustrating a method 3000 of false touch filtering according to one embodiment. The method 3000 may be performed by processing logic that may comprise hardware (circuitry, dedicated logic, etc.), software (such as is run on a general purpose computing system or a dedicated machine), firmware (embedded software), or any combination thereof. In one embodiment, the controller 330, 430, 530 630 of FIGS. 3, 4, 5 and 6 performs some of operations of method 3000. Alternatively, other components of the of the capacitance sensing system 300, 400, 500, and 678 of FIGS. 3, 4, 5, and 6 can perform some or all of the operations of method 3000.

Referring to FIGS. 30A and 30B, the method 3000 begins with finding local maximums (block 3001). If the number of local maximums is greater than zero, as determined at block 3002, the processing logic identifies touches (block 3003) and determines if the charger armor is enabled (block 3004). If at block 3004 the charger armor is enabled, the processing logic sets an index to zero (block 3005) and determines if the index is less than a number of touches (block 3006). If so, the processing logic calculates a sum of the three-by-three square of sense elements (block 3007), and finds a maximum value of the three-by-three square and saves the maximum value as a maximum index (block 3008). Next, at block 3009, the processing logic determines if a row location of the touch is within two rows of the maximum index in a previous cycle and if a column location of the touch is within two columns of the maximum index in the previous cycle. Block 3009 may be used to determine if the current touch is the same touch as from a previous cycle. In another embodiment, a finger identifier may be used to determine if the current touch is the same touch as from the previous cycle. If at block 3009, the processing logic determines that the touch is a new touch (New Finger Found=True) (block 3010), and increments the index (block 3026), returning to block 3006. Once the index is not less than the number of touches at block 3006, the processing logic determines if the noise level is above "Noise Level 2" (block 3011).

If so, the processing logic can perform a debounce routine to ensure the touch is a new touch. In particular, the processing logic determines if an old touch count (number of touches before the new touch) is greater than zero (block 3012). If so, the processing logic determines if the new touch is found and if the debounce count is less than two (block 3013) If so, the processing logic increments the debounce count and holds the previous coordinate data (XY data). The processing logic determines if the debounce count is zero (block 3016). If not, the processing logic returns to block 3011. If at block 3012, the old touch count is greater than zero, the processing logic sets the debounce count to zero (block 3015). Similarly, if at block 3013, the new touch is not found, or the debounce is not less than two, the processing logic sets the debounce count to zero at block 3015.

When the debounce count is zero at block 3016, the processing logic if the current touch count is not equal to the old touch count (block 3017). If not equal, the processing logic returns to block 3011. If equal at block 3017, the processing logic sets an index to zero (block 3018) and determines if the index is less than the touch count (block 3019). As long as the index is less than the touch count, the processing logic determines if a row location of the touch is within two rows of the maximum index in a previous cycle (block 3020). If not, the processing logic returns to block 3019 and increments the index (block 3023). If the row location is within two rows, the processing logic determines if the sum of the three-by-three square of adjacent sense elements is less than ⅞ the maximum value of the three-by-three square. If not, the processing logic returns to block 3019 and increments the index (block 3023). If the sum is less than ⅞ of the maximum value of the three-by-three square, the processing logic removes the indexed touch from the report, identifying the touch as a false touch, and returns to block 3019 and increments the index (block 3023).

When the index is not less than the touch count at block 3019, the processing logic saves the maximum row and the maximum column as the local maximum(es) of the touch(es) (block 3024), and reports the touch(es) to the host device (block 3025).

Returning back to block 3002, if the local maximum is not greater than zero, the processing logic sets the debounce count to zero (block 3027) and reports the touch(es) or no touches to the host device (block 3025).

In one embodiment, the false touch filtering described in FIGS. 30A-30B may be implemented in a device that tracks stationary or slowly moving touch objects (e.g., fingers, stylus, or other conductive objects). This approach checks for the previous location of the touch and not the current touch's location, which may be disadvantage when the touch is moving. The false touch filtering described in FIGS. 31A-31B uses a different approach that may provide various advantages over the approach in FIGS. 30A-30B. For example, the approach described below may work with multiple touches on the touch surface (panel of electrodes) and may locally identify potential noisy areas for each touch. Each of these areas may have its own local maximum Z magnitude to be compared to the other touches on the touch surface. It should be noted that in the embodiments described below, the method removes the "at least two columns away from the previous signal" at block 3020. This may be done to allowing false touch filtering when a larger touch might have two local maximums within two sense elements. Also, each touch position may be compared not to previous touch location, but to a current sense element with a maximum magnitude. This may significantly improve immunity for moving touches, especially fast moving touches, on the touch surface. This may need one additional loop for detecting the maximum magnitude first, as described below. In another embodiment, the method described below may be executed prior to position calculation and can save some extra time used by the position calculation of touches that are removed by the false touch filtering. In another embodiment, a debounce algorithm may be used for faster processing and the touches are analyzed for possible bad touches even when the debounce is holding the previous coordinate data (XY data). The method described below may be more efficient than the method 3000, but may have a longer execution time.

Figure 31A:
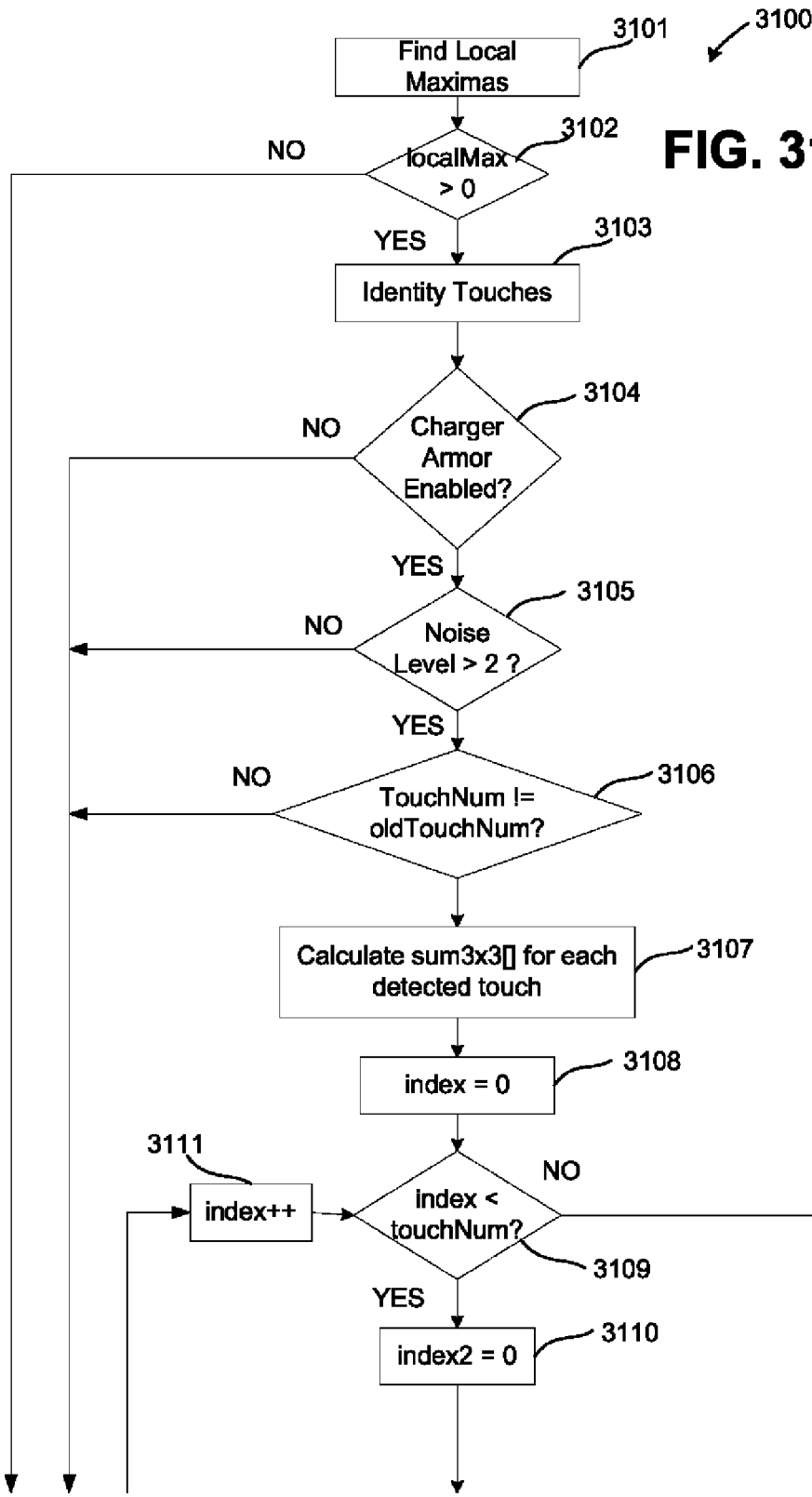
FIGS. 31A and 31B are flow chart illustrating a method of false touch filtering according to another embodiment.
Figure 31B:
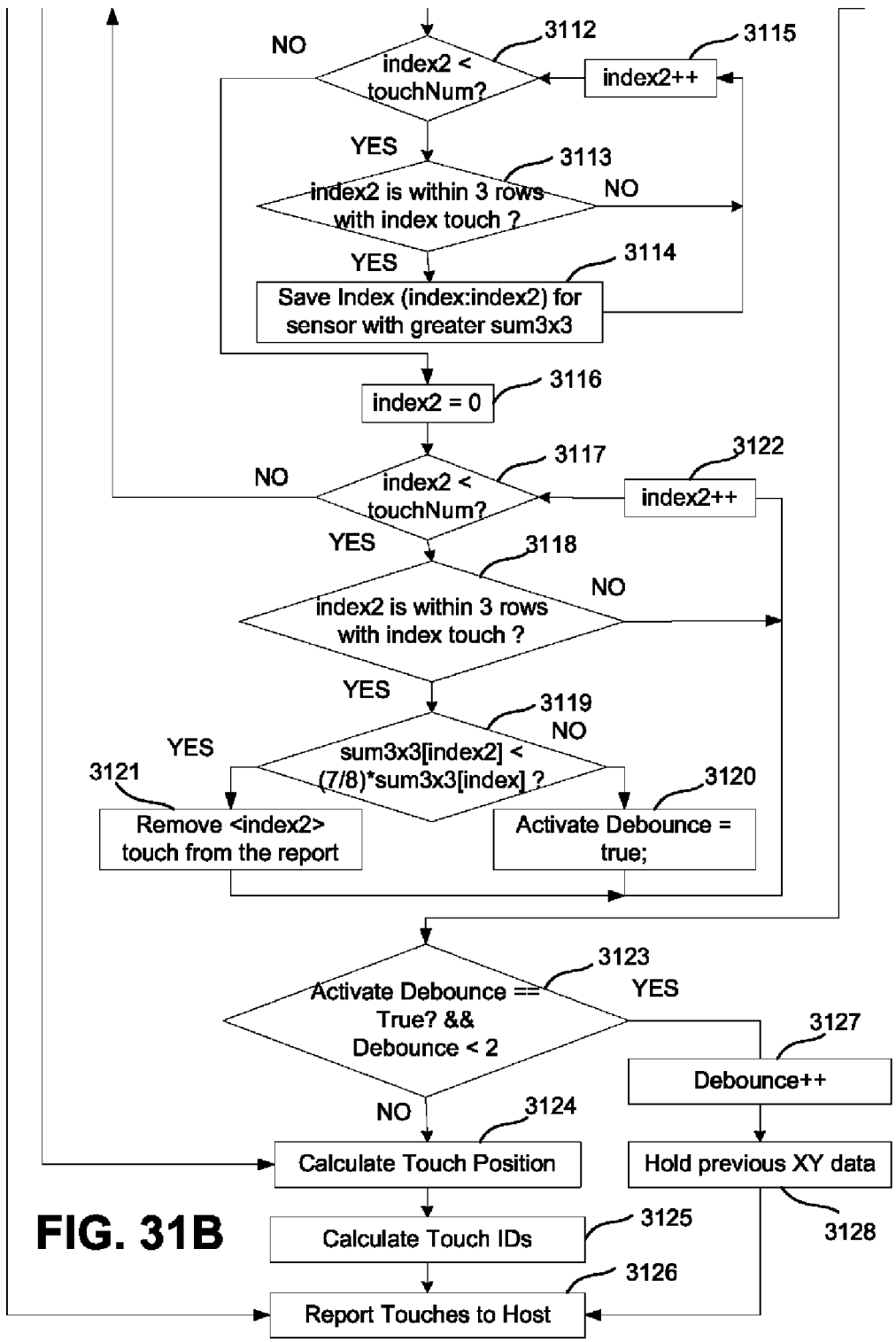

FIGS. 31A and 31B are flow chart illustrating a method 3100 of false touch filtering according to another embodiment. The method 3000 may be performed by processing logic that may comprise hardware (circuitry, dedicated logic, etc.), software (such as is run on a general purpose computing system or a dedicated machine), firmware (embedded software), or any combination thereof. In one embodiment, the controller 330, 430, 530 630 of FIGS. 3, 4, 5 and 6 performs some of operations of method 3100. Alternatively, other components of the of the capacitance sensing system 300, 400, 500, and 678 of FIGS. 3, 4, 5, and 6 can perform some or all of the operations of method 3100.

Referring to FIGS. 31A and 31B, the method 3100 begins with finding local maximums (block 3101). If the number of local maximums is greater than zero, as determined at block 3102, the processing logic identifies touches (block 3103) and determines if the charger armor is enabled (block 3104). If at block 3104 the charger armor is enabled, the processing logic determines if the noise level is above "Noise Level 2" (block 3105). If yes, the processing logic determines if the touch count is not equal to the old touch count (block 3106). If yes at block 3106, the processing logic calculates a sum of the three-by-three square of sense elements (block 3107) for each of the detected touches, sets an index to zero (block 3108), and determines if the index is less than a number of touches (block 3109). If yes, the processing logic sets a second index to zero (block 3110), and determines if the second index is less than the number of touches (block 3112). If yes at block 3112, the processing logic determines if the second index is within 3 rows within indexed touch (block 3113). If yes at block 3113, the processing logic saves the index for the sense element that is greater than the sum of the magnitudes of the three-by-three square of sense elements (block 3114), and returns to block 3112, incrementing the second index (block 3115).

If not at any one of the blocks 3104, 3105, and 3106, the processing logic calculates a touch position (block 3124), calculates a touch ID for the touches (Block 3125), and reports the touches to the host (block 3126). If at block 3112 the second index is less than the touch count, the processing logic sets the second index to zero (block 3116), and then determines if the second index is less than the touch count (block 3117). If yes, the processing logic determines if the second index is within 3 rows of the indexed touch (block 3118). If not, the processing logic increments the second index (block 3122), returning to block 3117. If the second index is within 3 rows of the indexed touch, the processing logic determines if the sum of a three-by-three square of the second index is less than the ⅞ the sum of the three-by-three square of the first index (block 3119). If so, the processing logic removes the second index touch from the report (block 3121), and increments the second index (block 3122), returning to block 3117. If no at block 3119, the processing logic activates the debounce (sets debounce=true) (block 3120), and increments the second index (block 3122), returning to block 3117.

When the index is not less than the touch count at block 3109, the processing logic determines if the debounce feature is activated and the debounce counter is less than two (block 3123). If yes, the processing logic increments the debounce counter (block 3127), holds the previous coordinate data (XY data) (block 3128), and reports the touches to the host (block 3126). If at block 3123 the debounce feature is not activated or the debounce feature is not less than two, the processing logic calculates a touch position (block 3124), calculates a touch ID for the touches (block 3125), and reports the touches to the host (block 3126).

In another embodiment, the method is modified to remove false touches for one stationary finger. This may be achieved as described above with respect to FIGS. 30A-30B, but may remove operations concerning the debounce feature, as described below with respect to FIG. 32. It should be noted that removing features from the false touch filtering may provide a less effective system, but may be a tradeoff for more simplicity in the technique and for reducing execution time. It should be noted that the methods described herein may be combined to achieve different benefits as would be appreciated by one of ordinary skill in the art having the benefit of this disclosure.

Figure 32:
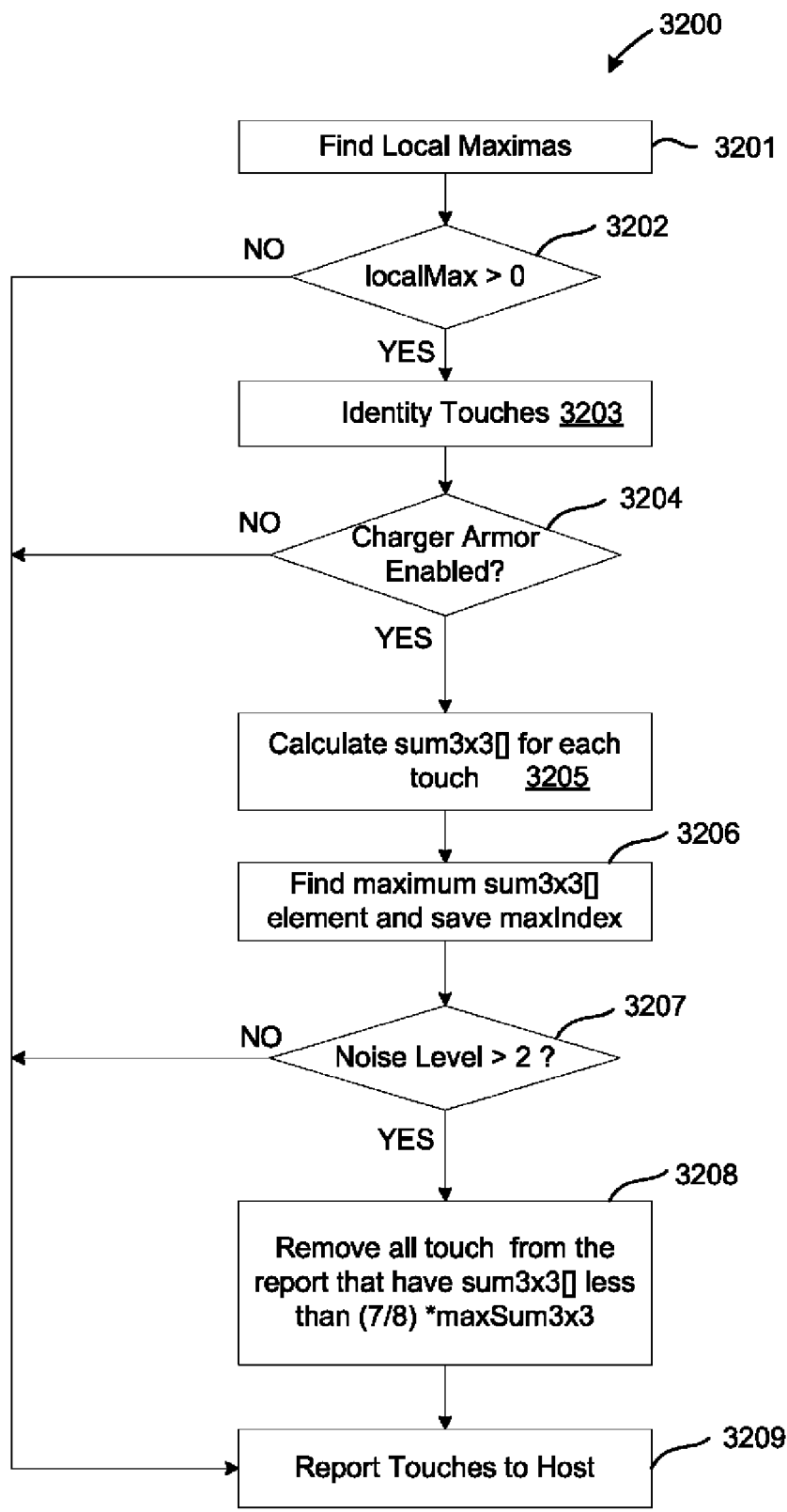
FIG. 32 is a flow chart illustrating a method of false touch filtering according to another embodiment.

FIG. 32 is a flow chart illustrating a method 3200 of false touch filtering according to another embodiment. The method 3200 may be performed by processing logic that may comprise hardware (circuitry, dedicated logic, etc.), software (such as is run on a general purpose computing system or a dedicated machine), firmware (embedded software), or any combination thereof. In one embodiment, the controller 330, 430, 530 630 of FIGS. 3, 4, 5 and 6 performs some of operations of method 3200. Alternatively, other components of the of the capacitance sensing system 300, 400, 500, and 678 of FIGS. 3, 4, 5, and 6 can perform some or all of the operations of method 3200.

Referring to FIG. 32, the method 3200 begins with finding local maximums (block 3201). If the number of local maximums is greater than zero, as determined at block 3202, the processing logic identifies touches (block 3203) and determines if the charger armor is enabled (block 3204). If at block 3204 the charger armor is enabled, the processing logic calculates a sum of the three-by-three square of sense elements (block 3205) for each of the detected touches, and finds a maximum sum of three-by-three square and the magnitude value as the maximum index (block 3206). Next, the processing logic determines if the noise level is above "Noise Level 2" (block 3207). If so, the processing logic removes all touches from the report that have a sum of the three-by-three square of adjacent sense elements that are less than ⅞ of the maximum sum of three-by-three square, and reports the touches to the host (block 3309). If no at blocks 3202, 3204, and 3207, the processing logic proceeds to block 3209 to report the touches to the host.

In one embodiment, the methods 3000-3200 may be implemented in a capacitance sensing system, including a memory device, and a controller coupled to the memory device. The controller may receive signals from a sense network comprising multiple electrodes to detect a conductive object proximate to the multiple electrodes. In one embodiment, the controller includes a filter circuit to receive data representing capacitance of the sense elements (intersections of the electrodes), process the data to identify activated sense elements from among the sense elements, and filter the data to remove false touch events based on a spatial relationship of activated sense elements. In a further embodiment, the controller also includes a filter circuit configured to filter output data to remove false touches caused by localized noise events. In another embodiment, the filter circuit is configured to identify a local maximum from among the activated sense elements. The filter circuit may calculate a sum of magnitude values of the activated sense elements, and subtract a magnitude value of the local maximum from the sum. The sum is compared against a threshold value to distinguish between an actual touch and a false touch. In another embodiment, the filter circuit is configured to identify a set of adjacent sense elements that are adjacent to the local maximum, and calculate a sum of magnitude values of the set of adjacent sense elements. This sum does not include the magnitude value of the local maximum. Like above, this sum is compared against a threshold value to distinguish between an actual touch and a false touch. In one embodiment, the set of adjacent sense elements includes a three-by-three square of sense elements round the local maximum. In another embodiment, the set of adjacent sense elements may have the sense elements that are within one or two rows or columns of the local maximum. Alternatively, the adjacent sense elements may be identified differently as would be appreciated by one of ordinary skill in the art having the benefit of this disclosure.

In another embodiment, the filter circuit is configured to determine whether the local maximum is located at a corner of the sense network or at an edge of the sense network. In one embodiment, the filter circuit identifies three adjacent sense elements for the set when the local maximum is located at the corner of the sense network, and identifies five adjacent sense elements for the set when the local maximum is located at the edge of the sense network. In another embodiment, the filter circuit is further configured to mirror the magnitude values of the set for the magnitude values for a second set of virtual sense elements, respectively. In this embodiment, the sum is the magnitude values of the set of sense elements and the magnitude values of the second set of virtual sense elements.

In another embodiment, the capacitance sensing system includes a sense network including electrodes that are disposed in a first set of transmit (TX) electrodes and a second set of receive (RX) electrodes. The controller of the capacitance sensing system is configured to measure a mutual capacitance between at least one of the first set of TX electrodes and an individual one of the second set of RX electrodes for one of the sense elements.

In another embodiment, a device includes a controller and a capacitance sensing array including multiple sense elements (e.g., intersections of TX and RX electrodes). The controller includes a capacitance sensing circuit coupled to the capacitance sensing array, and a filter circuit coupled to the output of the capacitance sensing circuit. The controller is configured to receive, from the capacitance sensing circuit, data representing capacitances of the sense elements, process the data to identify activated sense elements, and filter the data to remove false touch events based on a spatial relationship of activated sense elements. In one embodiment, the controller identifies a local maximum from among the activated sense elements, identifies a set of adjacent sense elements that are adjacent to the local maximum, and calculates a sum of magnitude values of the set of adjacent sense elements. The controller compares the calculated sum against a threshold value to distinguish between an actual touch and a false touch.

It should be noted that the embodiments of the false touch filtering are described in connection with some charger armor filtering techniques and frequency hopping techniques. However, in other embodiments, the false touch filtering may be implemented in other designs without the charger armor filtering techniques or the frequency hopping techniques.

The embodiments described herein may be used in various designs of mutual capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure. The embodiments described herein can use the false touch filtering to reject noise from the system, leaving only effective signals of touches. The false touch filtering may note filter the input data, but the final result that is based on the input data. As described herein, the false touch filtering may be used with other filtering techniques, such as charger armor filtering, frequency hopping, common mode filtering, median filtering, or the like.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
   receiving, from a sense network comprising a plurality of electrodes, data representing capacitances of a plurality of sense elements, wherein the plurality of sense elements are intersections between the plurality of electrodes;
   processing the data to identify activated sense elements from the plurality of sense elements, wherein the processing comprises:
     identifying a local maximum from among the activated sense elements; and
     identifying a set of sense elements that are adjacent to the local maximum;
   filtering the data to remove false touch events based on a spatial relationship of activated sense elements, wherein the filtering comprises comparing a magnitude value of the local maximum against an aggregate value based on at least three of the set of sense elements to distinguish between an actual touch and a false touch.

2. The method of claim 1, wherein the filtering further comprises distinguishing between the actual touch and the false touch based on the capacitances of the set of sense elements.

3. The method of claim 2, wherein the processing the data to identify the activated sense elements further comprises calculating a sum of magnitude values of the activated sense elements, wherein the comparing comprises comparing the sum against a threshold value to distinguish between the actual touch and the false touch.

4. The method of claim 2, wherein the processing the data to identify the activated sense elements further comprises:
   calculating a sum of magnitude values of the activated sense elements; and
   subtracting the magnitude value of the local maximum from the sum, wherein the comparing comprises comparing the sum against a threshold value to distinguish between the actual touch and the false touch.

5. The method of claim 2, wherein the processing the data to identify the activated sense elements further comprises calculating a sum of magnitude values of the set of sense elements, wherein comparing comprises comparing the sum against a threshold value to distinguish between the actual touch and the false touch.

6. The method of claim 2, wherein the identifying the set of sense elements comprises identifying a three-by-three square of sense elements around the local maximum.

7. The method of claim 2, wherein the identifying the set of sense elements comprises:
   determining whether the local maximum is located at a corner of the sense network; and
   identifying at least three sense elements that are adjacent to the local maximum for the set when the local maximum is located at the corner of the sense network.

8. The method of claim 2, wherein the identifying the set of sense elements comprises:
   determining whether the local maximum is located at a corner of the sense network;
   identifying three sense elements that are adjacent to the local maximum for the set when the local maximum is located at the corner of the sense network;
   identifying three or more virtual sense elements for the set when the local maximum is located at the corner of the sense network; and
   mirroring the magnitude values of the three sense elements for the magnitude values of the three or more virtual sense elements, and wherein the calculating the sum comprises adding the magnitude values of the three sense elements and the magnitude values of the three or more virtual sense elements.

9. The method of claim 2, wherein the identifying the set of sense elements comprises:
   determining whether the local maximum is located at an edge of the sense network;
   identifying five sense elements that are adjacent to the local maximum for the set when the local maximum is located at the edge of the sense network;
   identifying three or more virtual sense elements for the set when the local maximum is located at the edge of the sense network; and
   mirroring the magnitude values of the five sense elements for the magnitude values of the three or more virtual sense elements, and wherein the calculating the sum comprises adding the magnitude values of the five sense elements and the magnitude values of the three or more virtual sense elements.

10. A method comprising:
    receiving, from a sense network comprising a plurality of electrodes, data representing capacitances of a plurality of sense elements, wherein the plurality of sense elements are intersections between the plurality of electrodes;

processing the data to identify activated sense elements from the plurality of sense elements; and filtering the data to remove false touch events based on a spatial relationship of activated sense elements, wherein said processing the data to identify the activated sense elements comprises:

identifying a local maximum from among the activated sense elements;

identifying a set of sense elements that are adjacent to the local maximum, the identifying the set comprises:

determining whether the local maximum is located at an edge of the sense network; and identifying at least three sense elements that are adjacent to the local maximum for the set when the local maximum is located at the edge of the sense network; and distinguishing between an actual touch and a false touch based on the capacitances of the set of sense elements.

11. A capacitance sensing system, comprising a controller coupled to the memory device, wherein the controller is configured to receive signals from a sense network comprising a plurality of electrodes to detect a conductive object proximate to the plurality of electrodes, wherein the controller comprises a filter circuit, wherein the filter circuit is configured to:

receive, from the sense network, data representing capacitances of a plurality of sense elements, wherein the plurality of sense elements are intersections between the plurality of electrodes;

process the data to identify activated sense elements of the plurality of sense elements; and filter the data to remove false touch events based on a spatial relationship of activated sense elements, wherein the filter circuit is further configured to:

identify a local maximum from among the activated sense elements;

identify a set of sense elements that are adjacent to the local maximum; and comparing a magnitude value of the local maximum against an aggregate value based on at least three of the set of sense elements to distinguish between an actual touch and a false touch.

12. The capacitance sensing system of claim 11, wherein the filter circuit is configured to:

calculate a sum of magnitude values of the activated sense elements;

subtract the magnitude value of the local maximum from the sum; and compare the sum against a threshold value to distinguish between the actual touch and the false touch.

13. The capacitance sensing system of claim 11, wherein the filter circuit is configured to:

identify a set of sense elements that are adjacent to the local maximum;

calculate a sum of magnitude values of the set of sense elements; and compare the sum against a threshold value to distinguish between the actual touch and the false touch.

14. The capacitance sensing system of claim 11, wherein the set of sense elements comprises a three-by-three square of sense elements around the local maximum.

15. The capacitance sensing system of claim 13, wherein the filter circuit is further configured to:

determine whether the local maximum is located at a corner of the sense network or at an edge of the sense network;

identify three sense elements that are adjacent to the local maximum for the set when the local maximum is located at the corner of the sense network; and identify five sense elements that are adjacent to the local maximum for the set when the local maximum is located at the edge of the sense network.

16. The capacitance sensing system of claim 15, wherein the filter circuit is further configured to mirror the magnitude values of the set for the magnitude values for a second set of virtual sense elements, respectively, and wherein the sum is the magnitude values of the set of sense elements and the magnitude values of the second set of virtual sense elements.

17. The capacitance sensing system of claim 11, further comprising the sense network comprising the plurality of electrodes, and wherein the plurality of electrodes comprises a first set of transmit (TX) electrodes and a second set of receive (RX) electrodes, and wherein the controller is configured to measure a mutual capacitance between at least one of the first set of TX electrodes and an individual one of the second set of RX electrodes for one of the plurality of sense elements.

18. The capacitance sensing system of claim 11, further comprising a capacitance sensing array comprising a plurality of sense elements, the capacitance sensing array coupled to the controller.

19. The capacitance sensing system of claim 18, wherein the controller is configured to:

calculate a sum of magnitude values of the set of sense elements; and comparing the sum against a threshold value to distinguish between the actual touch and the false touch.

* * * * *